United States Patent
Qiu

(10) Patent No.: US 12,208,450 B1
(45) Date of Patent: Jan. 28, 2025

(54) INTEGRATED ACOUSTIC AND THERMAL MODULATION FOR OPTIMIZED 3D METAL FABRICATION

(71) Applicant: ULTRASONIUM INC, Woburn, MA (US)

(72) Inventor: Jack Yanjie Qiu, Woburn, MA (US)

(73) Assignee: ULTRASONIUM INC, Woburn, MA (US)

( * ) Notice: Subject to any disclaimer, the term of this patent is extended or adjusted under 35 U.S.C. 154(b) by 0 days.

(21) Appl. No.: 18/755,665

(22) Filed: Jun. 27, 2024

(51) Int. Cl.
| | |
|---|---|
| B22F 10/50 | (2021.01) |
| B22F 10/73 | (2021.01) |
| B22F 10/85 | (2021.01) |
| B22F 12/55 | (2021.01) |
| B22F 12/90 | (2021.01) |
| B33Y 10/00 | (2015.01) |
| B33Y 30/00 | (2015.01) |
| B33Y 40/00 | (2020.01) |
| B33Y 50/02 | (2015.01) |

(52) U.S. Cl.
CPC ............ *B22F 10/50* (2021.01); *B22F 10/73* (2021.01); *B22F 10/85* (2021.01); *B22F 12/55* (2021.01); *B22F 12/90* (2021.01); *B33Y 10/00* (2014.12); *B33Y 30/00* (2014.12); *B33Y 40/00* (2014.12); *B33Y 50/02* (2014.12); *B22F 2998/10* (2013.01)

(58) Field of Classification Search
CPC .......... B22F 10/50; B22F 10/73; B22F 10/85; B22F 12/55; B22F 12/90; B22F 2998/10; B33Y 10/00; B33Y 30/00; B33Y 40/00; B33Y 50/02
See application file for complete search history.

(56) References Cited

U.S. PATENT DOCUMENTS

| | | |
|---|---|---|
| 9,908,288 B2 | 3/2018 | Harkness et al. |
| 10,124,311 B2 | 11/2018 | Sinha et al. |
| 10,214,013 B2 | 2/2019 | Foresti et al. |
| 10,695,980 B2 | 6/2020 | Harkness et al. |

(Continued)

OTHER PUBLICATIONS

Is Sriphutkiat, Y. (2019). Development of acoustic nozzle for 3D printing, Doctoral thesis, Nanyang Technological University, Singapore (Year: 2019).*

*Primary Examiner* — Rebecca Janssen
(74) *Attorney, Agent, or Firm* — Levine's Tech Consulting, LLC; Frank E. Levine

(57) ABSTRACT

This invention pertains to a system and method for three-dimensional (3D) printing using acoustic modulation to control the flow and solidification of various materials, with integrated thermal management and real-time analytical adjustments. The system addresses the challenges of controlling the solidification process in non-solid states, which can lead to defects. It utilizes acoustic emitters for precise modulation, a material dispensing unit adaptable to various materials, and an advanced control system for synchronization. The method involves material dispensing followed by acoustic modulation to mold the material. Adjustments based on sensor feedback ensure a seamless transition from non-solid to solid states. The system can handle diverse materials and create multi-material objects with tailored properties. Applications include the fabrication of 3D objects with enhanced structural integrity, surface finish, and complex geometries, as well as functionally graded materials and composites.

19 Claims, 8 Drawing Sheets

(56) References Cited

U.S. PATENT DOCUMENTS

| | | |
|---|---|---|
| 11,413,820 B2 | 8/2022 | Eisaman et al. |
| 11,491,715 B2 | 11/2022 | Melde et al. |
| 11,752,687 B2 | 9/2023 | Kim et al. |
| 11,806,929 B2 | 11/2023 | Collino et al. |
| 2004/0204785 A1 | 10/2004 | Richardson |
| 2016/0228991 A1 | 8/2016 | Ryan et al. |
| 2018/0304500 A1 | 10/2018 | Putkis |
| 2020/0290392 A1 | 9/2020 | Rhee |
| 2023/0045959 A1 | 2/2023 | Smith et al. |
| 2023/0339181 A1* | 10/2023 | Habibi .................. B33Y 10/00 |

* cited by examiner

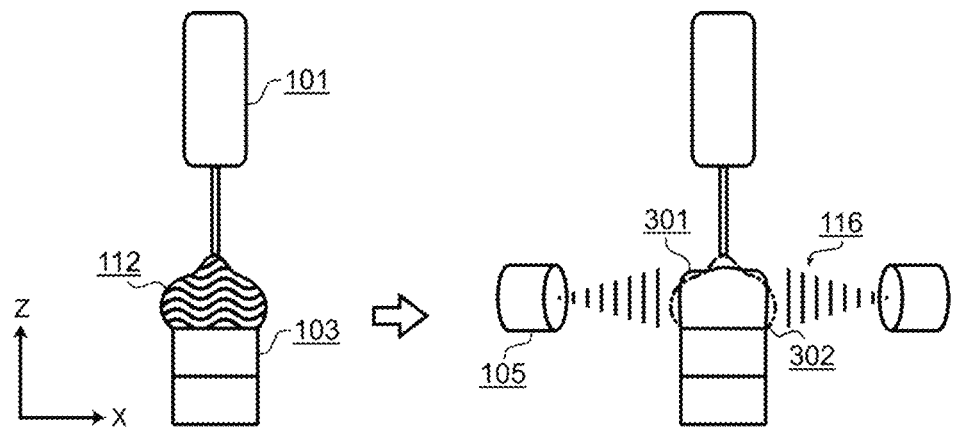
FIG. 3A  FIG. 3B
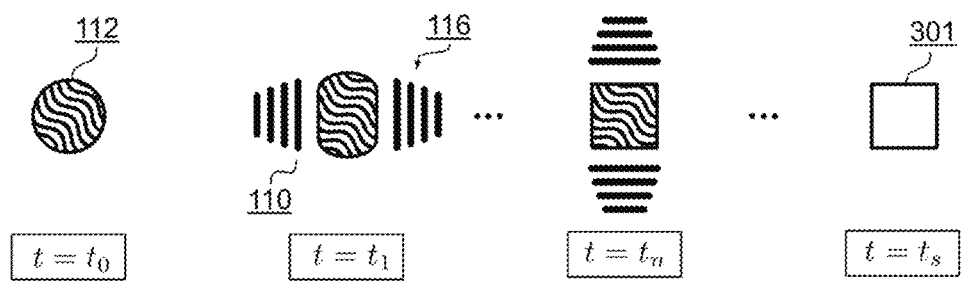
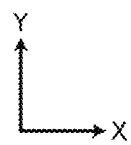
FIG. 4

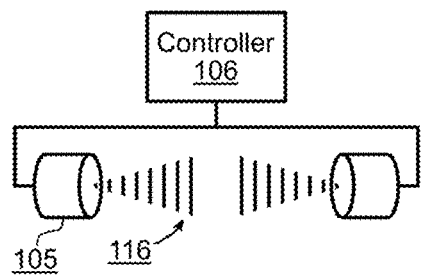
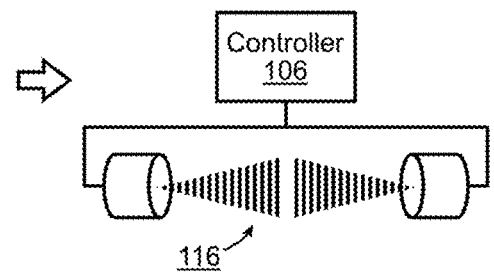
FIG. 5A   FIG. 5B
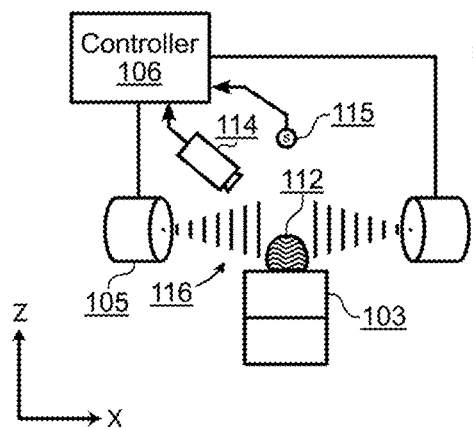
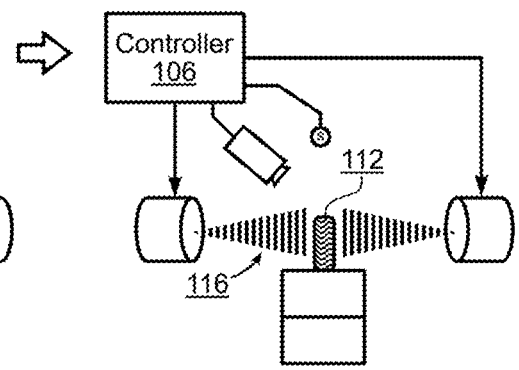
FIG. 6A   FIG. 6B

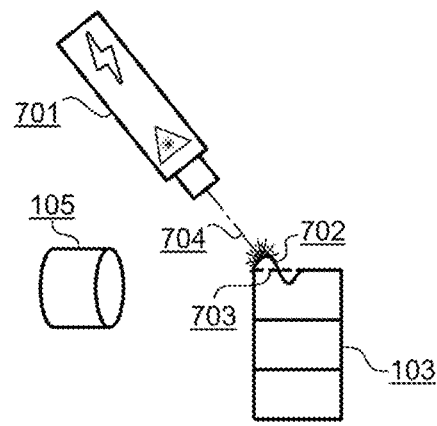
FIG. 7A
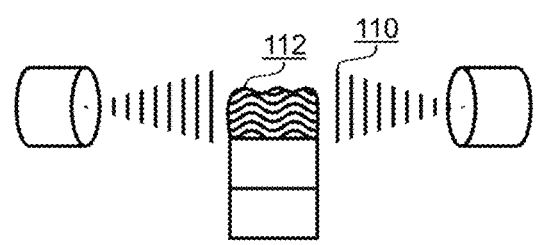
FIG. 7B
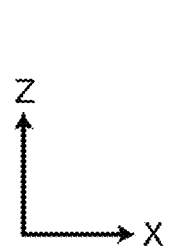
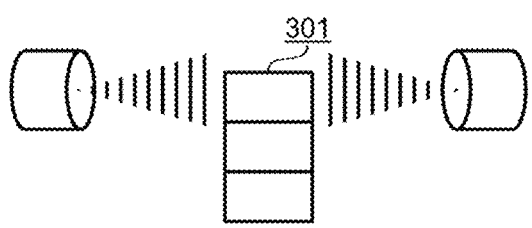
FIG. 7C

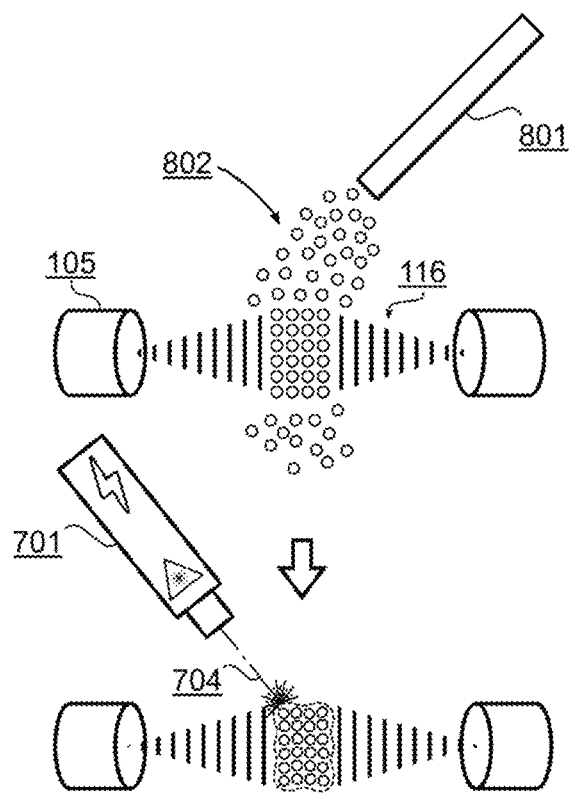
FIG. 8A
FIG. 8B
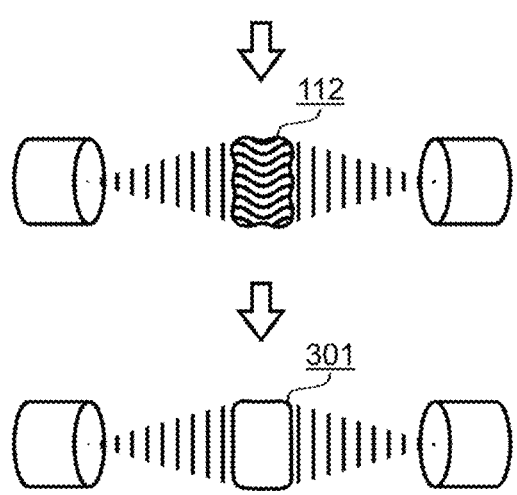
FIG. 8C
FIG. 8D

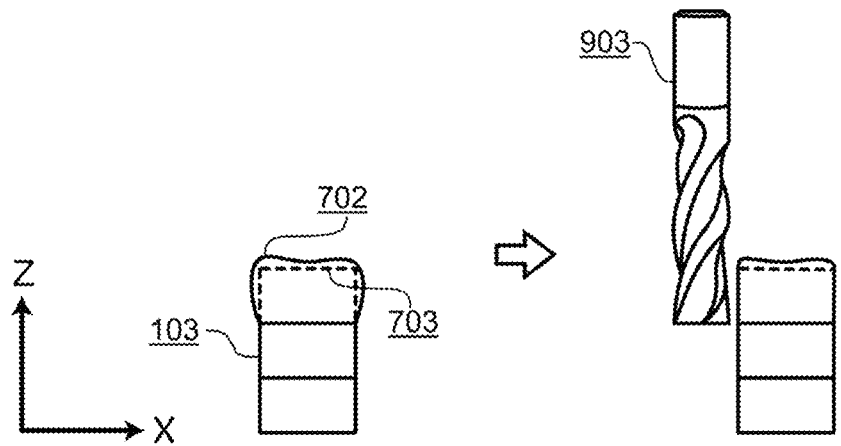
FIG. 9A   FIG. 9B
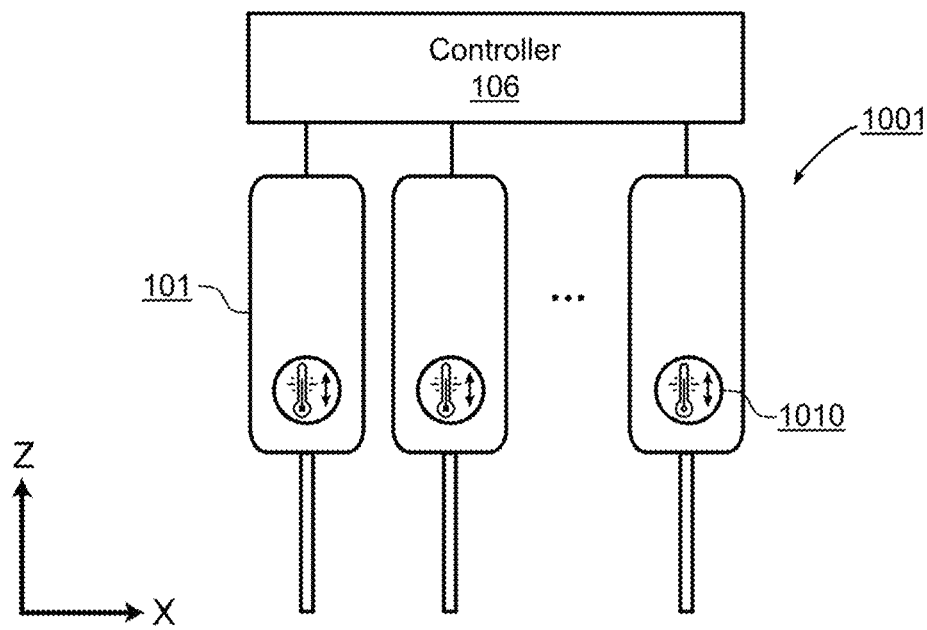
FIG. 10

INTEGRATED ACOUSTIC AND THERMAL MODULATION FOR OPTIMIZED 3D METAL FABRICATION

BACKGROUND OF THE INVENTION

The invention relates to the field of additive manufacturing, specifically to a system and method for three-dimensional (3D) printing of various materials using acoustic modulation to control the flow and solidification of the materials, with integrated thermal management and real-time analytical adjustments to the composition of printing materials.

SUMMARY OF THE INVENTION

The present invention relates to a method and system for molding materials printed by a three-dimensional printing apparatus using acoustic modulation. The invention addresses the challenges associated with thermal fluid dynamics and inhomogeneities in additive manufacturing by focusing on the serial growth of components in a layer-by-layer manner, rather than attempting to pattern the entire two-dimensional (2D) or three-dimensional shape using acoustics.

In one aspect, the method involves dispensing a material from the three-dimensional printing apparatus and dynamically applying acoustic pressure to different spatial locations across the material to mold it into a predefined form. The method utilizes multi-modal acoustic waves that simultaneously operate at different frequencies to optimize the acoustic molding process. In a particular embodiment, the acoustic pressure is applied to the material in a non-solid state, and the area of the acoustic pressure is localized to be less than or equal to the dimensions of the material.

In some embodiments, the method further includes heating the material into a non-solid state, controlling the rate of solidification, and heating the material after solidification to a reconstituted non-solid state for further adjustment of the acoustic pressure. Additionally, the method may involve removing a portion of the material after solidification, analyzing data from sensors to determine parameters for adjusting the acoustic pressure, and dispensing and applying different materials onto the surface.

In another aspect, the invention provides a system comprising a dispensing unit, a material placed in the dispensing unit, an acoustic emitter system for applying acoustic pressure to the material, a controller for operating the acoustic emitter system, processors, memory, and a set of computer program instructions. The system executes the steps of dispensing the material, dynamically applying acoustic pressure to different spatial locations across the material to mold it into a predefined form, and utilizing multi-modal acoustic waves at different frequencies to optimize the acoustic molding process.

In certain embodiments, the system further includes a temperature regulation system for adjusting the temperature of the material in a non-solid state, additional heating sources, and sensors for obtaining data to determine parameters for adjusting the acoustic pressure. The acoustic emitter system can generate acoustic wave patterns dynamically calibrated based on real-time feedback from the sensors. In some instances, the dispensing unit may be adapted for dispensing at least two material types and may include feed mechanisms for simultaneous dispensing of multiple materials to create composite objects with optimized properties.

Moreover, in specific embodiments, the system may incorporate an automated collection and recycling system for reclaiming and reintegrating material residues into the three-dimensional printing apparatus, as well as stimulative means for controlling the rate of solidification and subtractive means for removing portions of the material after solidification.

The invention offers a novel approach to additive manufacturing by leveraging acoustic modulation to precisely control the properties and behavior of materials during their transition from non-solid to solid states. By focusing on the serial growth of components and employing localized acoustic pressure, the invention enables the creation of objects with complex geometries, optimized properties, and enhanced material integrity. The integration of real-time monitoring, dynamic adjustment of acoustic parameters, and multi-material capabilities further expands the versatility and efficiency of the additive manufacturing process.

It should be noted that the features, capabilities, and advantages described herein are not limited to the specific embodiments mentioned and may be combined or modified in various ways to achieve the desired outcomes. The details of these embodiments and their combinations are further elaborated in the following description and the accompanying drawings.

BRIEF DESCRIPTION OF DRAWINGS

FIG. 3A, 3B illustrate the molding of the material using acoustic pressure, showing the material in its original form and its desired form after the application of acoustic pressure.

FIG. 4 presents a time-lapse illustration of the acoustic wave adjustment process, depicting the material in a non-solid state, the application of acoustic waves, and the adjustment of acoustic waves prior to solidification.

FIG. 5A, 5B demonstrate the process of adjusting acoustic pressure by modifying the emitted patterns of the acoustic waves, showing the initial configuration and the dynamic adjustment based on real-time data.

FIG. 6A, 6B depict the integration of sensors for real-time monitoring of the deposition process, illustrating the capture of real-time data and the dynamic adjustment of acoustic wave parameters based on the received data.

FIG. 7A, 7B, 7C illustrate the integration of a localized heating source to refine the deposition and solidification of a material, showing a defective print, the application of localized heating, and the molding of the material using acoustic waves.

FIG. 8A, 8B, 8C, 8D depict a specific embodiment of the method in which solid powders are processed using a dual-phase dispensing unit, illustrating the manipulation of powders using acoustic waves, the heating of powders, the adjustment of acoustic pressure, and the solidification of the material.

FIG. 9A, 9B demonstrate the integration of subtractive machining tools into the 3D printing process, showing a defective print and the use of a subtractive machining tool to conform the part to the desired design.

FIG. 10 presents an embodiment incorporating a plurality of feed mechanisms and dispensing units for concurrent dispensing of different material types, facilitating the construction of intricate and functionally diverse composite objects.

DETAILED DESCRIPTION OF THE INVENTION

Figure 1:
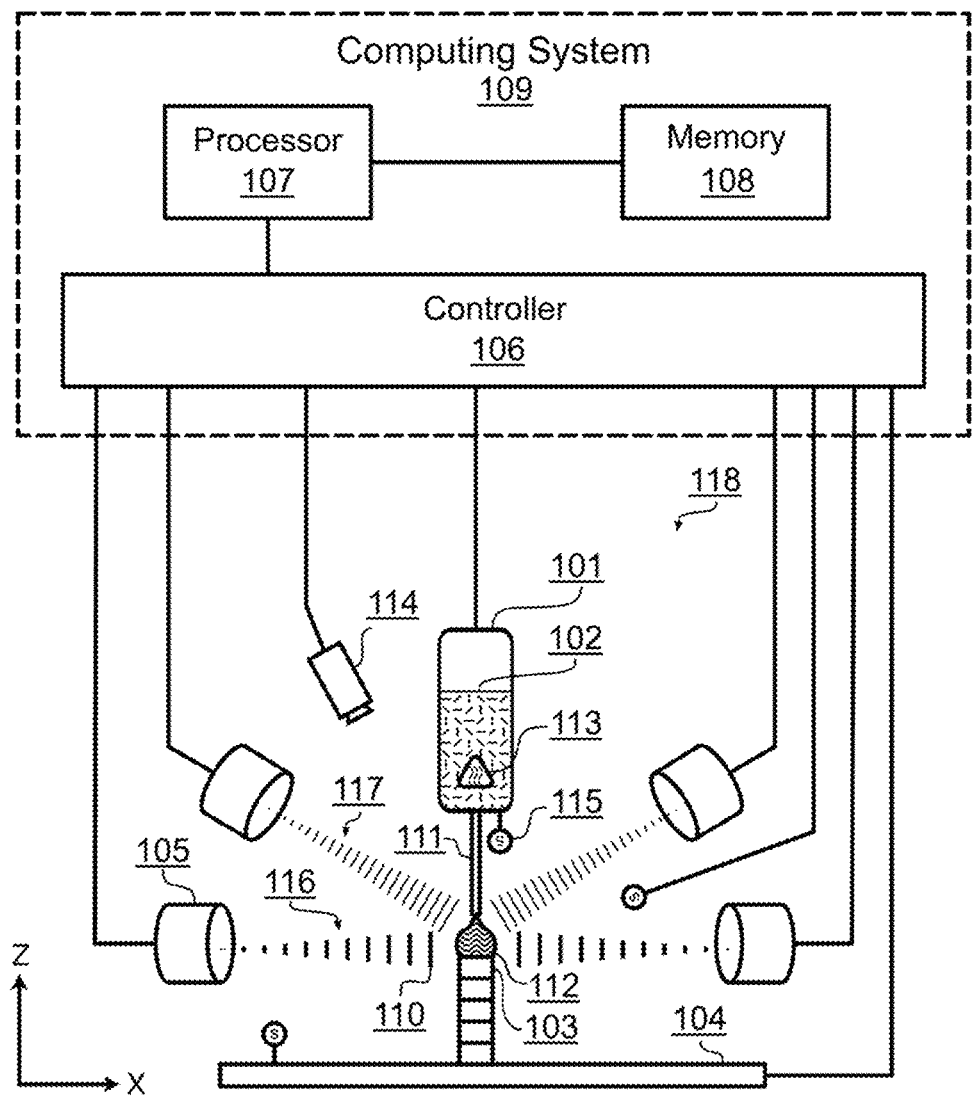
FIG. 1 presents a frontal view of a 3D printing system incorporating acoustic modulation, including a dispensing unit, an acoustic emitter system, and a controller for real-time monitoring and control of the printing process.

Additive manufacturing, also known as 3D printing, has undergone significant advancements in recent years, with the development of diverse technologies such as Selective Laser Melting (SLM), Electron Beam Melting (EBM), and advanced liquid droplet-based printing. These innovations have greatly expanded the ability to create intricate designs and complex geometries, surpassing the limitations of traditional manufacturing techniques. The applications of additive manufacturing span a wide range of industries, including aerospace, automotive, biomedical, and consumer products, among others.

In the field of metal additive manufacturing, techniques like SLM and EBM have revolutionized the production of complex metal components by using high-energy sources such as lasers and electron beams to selectively melt and fuse powder layers. These processes enable the fabrication of parts with intricate internal structures, customized geometries, and minimal material waste. However, the rapid heating and cooling cycles inherent to these techniques can introduce challenges such as residual stresses, microstructural inhomogeneities, and anisotropic mechanical properties, which can compromise the integrity and performance of the final products.

Similarly, in the broader additive manufacturing landscape, various methods employ light, heat, or chemical processes to manipulate materials ranging from polymers and ceramics to composites and bio-inks. While these technologies offer the potential for creating complex structures with tailored properties, they also face challenges in achieving precise control over the behavior of the printing material during deposition and solidification. Factors such as viscosity, surface tension, and cooling rates critically influence the quality of the printed object, affecting aspects such as layer adhesion, dimensional accuracy, and structural uniformity.

Liquid droplet-based printing techniques, such as inkjet and aerosol jet printing, have shown promise for the additive manufacturing of polymers, ceramics, and even biological materials. However, these methods are particularly sensitive to the dynamics of droplet formation, coalescence, and solidification, as well as to the rheological properties of the printing material, which encompass the flow behavior and deformation characteristics of the material under applied forces. Inadequate control over these factors can lead to defects such as porosity, surface roughness, and non-uniform mechanical properties, which can limit the reliability and functionality of the printed objects.

The challenges associated with managing thermal gradients, solidification dynamics, and material behavior during the additive manufacturing process are not limited to a single material class but extend across metals, polymers, ceramics, and composites. Achieving optimal interlayer bonding, microstructural control, and consistent mechanical properties is a common goal that requires advanced process monitoring, control, and optimization techniques.

Despite the progress made in additive manufacturing, there remains a need for innovative solutions that enhance the precision, reliability, and adaptability of these technologies across a wide range of materials and applications. Overcoming the limitations imposed by rapid material processing, complex thermal histories, and variable material behavior is crucial for expanding the utility of additive manufacturing in producing high-performance components that meet stringent requirements for mechanical integrity, dimensional accuracy, and functionality.

Given the deficiencies of the prior art, the present invention addresses significant challenges in additive manufacturing processes, particularly those related to thermal fluid dynamics and material inhomogeneities. Existing methods often struggle with achieving precise control over material flow, distribution, and solidification, leading to issues such as residual stresses, poor interlayer bonding, and anisotropic properties. These challenges can result in printed objects with compromised structural integrity, inconsistent material properties, and suboptimal performance. To overcome these limitations, the invention utilizes a novel multi-modal acoustic wave approach. This method employs acoustic waves operating simultaneously at different frequencies, typically combining high-frequency and low-frequency waves. The high-frequency waves, characterized by shorter wavelengths, enable manipulation of fine details and surface textures through localized vibrations, achieving higher spatial resolution and smoother surfaces. Concurrently, low-frequency waves with longer wavelengths penetrate deeper into the material, ensuring uniformity throughout by evenly distributing it and relieving internal stresses. This multi-modal approach offers several advantages: it promotes thorough mixing and uniform distribution of particles, mitigating material inhomogeneities; it allows for better stress management during solidification by inducing both bulk material movement and localized stress relaxation; it enables precise microstructural control, influencing the formation of specific material structures; and it improves interlayer adhesion by promoting mixing between layers while refining interfaces. Furthermore, the method permits selective application of different frequency combinations in various regions or directions, enabling controlled anisotropy in material properties tailored for specific applications. The multi-modal acoustic wave approach provides a more nuanced and adaptable control over material behavior, allowing real-time adjustments to variations in material properties, environmental conditions, or geometry requirements. By optimizing energy distribution and enhancing material properties across multiple scales simultaneously, this process significantly improves the overall quality, structural integrity, and performance of additively manufactured objects, making it particularly effective for complex and high-performance applications.

The disclosed approaches introduce a system and method for additive manufacturing that address these challenges by integrating acoustic modulation with precise control over material dispensing. This system facilitates the fabrication of objects from a diverse array of materials with improved accuracy and integrity. By providing a means to precisely manipulate the flow and solidification of printing materials in real-time, this invention aims to overcome the limitations of existing additive manufacturing technologies and unlock new possibilities for creating complex, high-performance structures with tailored properties and functionalities.

The associated method exemplifies a strategic approach to additive manufacturing, beginning with material dispensing followed by acoustic modulation to mold the material. Adjustments based on sensor feedback ensure a seamless transition from non-solid to solid states across deposited layers, including provisions for additional processing in a reconstituted non-solid state, showcasing the flexibility and adaptability of the system.

Figure 2:
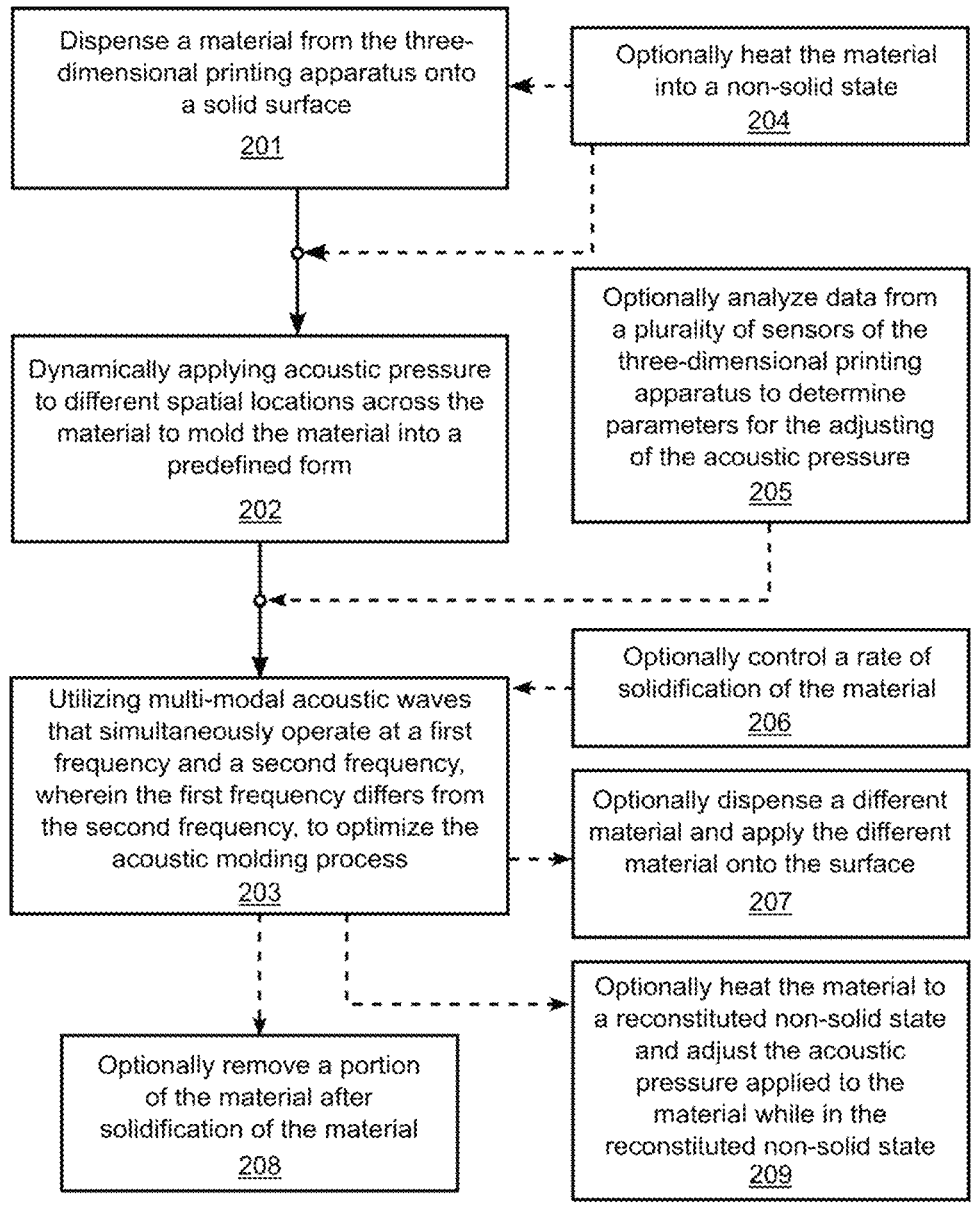
FIG. 2 showcases a schematic representation of the core process and specific enhancements within the additive manufacturing technique, emphasizing the use of acoustic radiation force for improved precision and control.

In contrast to traditional approaches that do not involve assistive means to polish the layer lines during fabrication, the disclosed approaches employ temperature controls and external forces such as acoustic fields to ensure higher build quality, reducing the need for rigorous post-processing. This is achieved through a series of steps, as illustrated in FIG. 1 and FIG. 2. Step 201 from FIG. 2 involves dispensing a material 102 (in FIG. 1) from the 3D printing apparatus onto a receiving surface. This receiving surface may include, but is not limited to, the following embodiments: a solid surface such as a previously printed layer 103, a substrate of any suitable material, or a dedicated print bed 104; a rotating platform that facilitates continuous or angular layer deposition; a conveyor belt system that enables sequential layer printing for continuous manufacturing processes; a flexible film that can be dynamically adjusted to optimize the printing process by providing variable surface properties; a liquid bath or gel substrate that supports the material in its non-solid state prior to solidification; an inflatable or deformable surface that can change shape to accommodate complex geometries; a magnetic or electrostatic surface designed to hold and release the material at specific stages of the printing process; a thermally controlled surface that can be heated or cooled to influence the material solidification process; a porous or permeable surface that allows for solvent or gas exchange to aid in material deposition and solidification; and a vibrating platform to assist in leveling or spreading the material before solidification. These various embodiments provide flexibility and adaptability in the 3D printing process, ensuring that the system can accommodate a wide range of materials and printing requirements.

The material 102 can be in various states, including, but not limited to, liquid, solid particulate, semi-solid, gaseous, or plasma. The material 102 may be composed of a single substance or a mixture of substances, such as metals, polymers, ceramics, composites, bio-inks, hydrogels, or any combination thereof. The process may optionally include Step 204 of heating the material into a non-solid state 112 before, during, or after the dispensing step. The previously printed layer 103 can be of the same material as the material 102 being dispensed or a different material, depending on the desired composition of the final object. The substrate and the dedicated print bed 104 can be made of various materials, such as metals, polymers, ceramics, composites, or any other suitable material that provides a stable and compatible surface for the printing process.

In Step 202, acoustic pressure 110 is dynamically applied to different spatial locations across the dispensed material 102, or in a specific embodiment, to the material in its non-solid state 112, to mold the material into a predefined or desired form 301 (in contrast to the original form 302 of the material in the non-solid state), as illustrated in FIG. 3A, 3B. This molding is achieved by applying acoustic waves 116 via an acoustic emitter system 105. The acoustic waves 116 can be in the form of standing waves, traveling waves, or a combination thereof. The acoustic modulation can be achieved using standing waves and traveling waves, which can be generated and manipulated by the acoustic emitter system 105 as shown in FIG. 1. In general, the acoustic modulation encompasses various types of acoustic waves, including, but not limited to, traveling waves which continuously move through a medium transferring energy; standing waves characterized by fixed nodes and antinodes; pulse waves consisting of single or short bursts of disturbances; sinusoidal waves with a harmonic form; nonlinear waves deviating from the principle of superposition due to medium nonlinearities; dispersive and non-dispersive waves where wave speed varies or remains constant across frequencies, respectively; transverse and longitudinal waves where particle displacement occurs perpendicular or parallel to the direction of propagation; and surface waves, such as Rayleigh and Love waves, which travel along the surfaces of solids. Each of these wave types provides distinct advantages for different material properties and deposition requirements. The acoustic emitter system 105 can be configured to produce and adjust these acoustic modes in real-time, allowing for control over the material behavior. Furthermore, the acoustic emitter system 105 can generate and manipulate these waves by varying parameters such as frequency, amplitude, phase, position, and spatial orientation, thereby enabling control over the shape and distribution of the dispensed material 102 or the material in its non-solid state 112. The desired form 301 can be any three-dimensional shape, such as a simple geometric shape (e.g., a sphere, a cube, or a cylinder), a complex freeform shape, or a shape that is complementary to the shape of the previously printed layer 103 or the substrate.

The process may further include Step 205 (in FIG. 2) of analyzing data from a plurality of sensors integrated into the 3D printing apparatus to determine parameters for adjusting the acoustic pressure. As shown in FIG. 1, the sensors 115 can include, but are not limited to, temperature sensors, pressure sensors, flow sensors, optical sensors, acoustic sensors, cameras 114, or any other suitable sensors that can provide real-time data about the state of the material and the progress of the printing process. The data collected by the sensors 115 can be analyzed by a computing system 109 using various algorithms, such as statistical analysis, machine learning, or artificial intelligence, to determine the optimal parameters for adjusting the acoustic waves 116. These parameters can include phase, amplitude, frequency, position, and spatial orientation of the acoustic emitter system 105. The adjustment of the acoustic waves 116 can be continuous or intermittent and can be performed in real-time during the printing process to ensure optimal molding and distribution of the material. For instance, in one embodiment, the system utilizes temperature and pressure sensors 115 to monitor the ambient gas temperature and pressure, which directly affect the speed of acoustic wave propagation in the printing environment. If the sensors detect an increase in ambient temperature, leading to faster acoustic propagation, the system might adjust the phase and timing of the acoustic waves 116 to compensate for the changed propagation speed. This adjustment ensures that the acoustic waves arrive at the intended locations with the correct phase relationships, maintaining the desired interference patterns and spatial resolution of the acoustic field. Additionally, the system might fine-tune the amplitude of the waves to account for any changes in acoustic impedance due to the temperature variation, ensuring consistent energy transfer to the printing material.

In another embodiment, the system employs high-speed cameras to detect deviations in the printed structure from the intended design in real-time. If the cameras identify discrepancies, such as obtrusions, overhangs, or dimensional inaccuracies, the system can implement immediate corrective measures through precise acoustic modulation. For instance, if an obtrusion is detected where excess material has been deposited beyond the intended boundaries of the print, the system rapidly calculates the necessary corrective action. It then generates a focused acoustic pressure field directed at the obtrusion, effectively pushing the excess material back into the desired form. The acoustic emitter system 105 adjusts the phase, amplitude, and direction of the acoustic waves to create a localized pressure gradient that reshapes the material without disturbing the surrounding correctly printed areas. This acoustic molding process can be applied with high precision, allowing for fine adjustments to the print geometry. The high-speed camera continues to monitor the reshaping process, providing feedback to the system, which can then make further refinements to the acoustic field as needed. This real-time, feedback-driven approach enables the system to continuously optimize the printing process, correcting errors as they occur and ensuring the final product closely matches the intended design specifications with high accuracy and minimal material waste.

FIG. 4 illustrates Step 202 in detail, showing the interaction between the acoustic waves 116 and the material in its non-solid state 112 at different time points in this particular embodiment. It should be noted that this method of applying acoustic waves is not limited to materials in a non-solid state but is also applicable to materials in other states. At time $t=t_0$, the material starts in a non-solid state 112. The non-solid state 112 can be a liquid state, a molten state, a softened state, a viscous state, a gel state, a paste state, a suspension state, a colloid state, a plasma state, or any other state that allows the material to be molded by the application of acoustic pressure. At time $t=t_1$, where $t_1 \geq t_0$, the acoustic waves 116 are applied, and the resulting acoustic pressure 110 molds the material. The molding of the material can involve deformation, flow, mixing, leveling, smoothing, or any other process that changes the shape or distribution of the material in response to the applied acoustic pressure. At a later time $t=t_n$, where $t_n \geq 1$, the acoustic pressure 110 is adjusted, prior to the material solidifying into the desired form 301 at time $t=t_s$. The solidification of the material can be induced by cooling, curing, polymerization, crystallization, or any other process that transforms the material from a non-solid state to a solid state.

In FIG. 2, Step 203 involves utilizing multi-modal acoustic waves that simultaneously operate at a first frequency of a first acoustic wave 116 (in FIG. 1) and a second frequency of a second acoustic wave 117 (in FIG. 1), wherein the first frequency differs from the second frequency, to optimize the acoustic molding process. In one embodiment, the process employs a combination of high-frequency and low-frequency waves. High-frequency waves, with shorter wavelengths, refine fine details and surface textures through localized vibrations, achieving higher spatial resolution and smoother surfaces. In contrast, low-frequency waves, with longer wavelengths, penetrate deeper, ensuring uniformity throughout the material by evenly distributing it and relieving internal stresses. This multi-modal approach leverages the different penetration depths and energy distribution characteristics of the waves, balancing precise surface refinement with deep internal consistency. By optimizing energy distribution and enhancing material properties, this process significantly improves the overall quality and structural integrity of the molded material, making it highly effective for complex and high-performance applications.

Various modulation techniques, including but not limited to amplitude modulation (AM), frequency modulation (FM), and phase modulation (PM), can be employed to control the properties of the acoustic waves, thereby allowing precise manipulation of the material being molded. These modulation techniques are inherently multi-modal, facilitating the simultaneous operation of acoustic waves at different frequencies and enhancing the overall effectiveness of the process. For example, in a specific embodiment utilizing frequency modulation (FM), the system employs a carrier wave at 30 KHz that is frequency modulated by a 5 kHz signal. This FM process generates multiple sidebands around the carrier frequency, creating a multi-modal acoustic field with significant components at 25 kHz, 30 kHz, and 35 kHz, along with weaker sidebands at further intervals of 5 kHz. The system can dynamically adjust the modulation index to control the energy distribution among these modes, tailoring the acoustic field to the specific requirements of the material and the desired molding outcome.

The system is designed to accommodate the differential responses of various materials to acoustic waves, with an adaptive configuration that automatically selects or adjusts frequencies based on the specific physical and chemical properties of the material in use. For example, materials with softer consistencies may require the application of lower frequencies to achieve optimal molding results, whereas materials with higher hardness may necessitate the use of higher frequencies. Additionally, the multi-modal system can dynamically modulate the amplitude, frequency, and phase of the acoustic waves to target different layers or regions within the material, ensuring uniform treatment throughout its volume. This adaptability ensures that the system can effectively manage a wide range of materials, enhancing the versatility and efficacy of the acoustic molding process across diverse applications. By leveraging the multi-modal approach, the system optimizes energy distribution and enhances material properties, resulting in superior surface refinement and deep internal consistency.

Harmonic waves, which are generated when primary waves produce secondary harmonic waves at multiples of the original frequency, can achieve finer details and more precise control over the molding process. This allows for enhanced surface quality and intricate detailing. In a specific multi-modal embodiment, the system employs a fundamental frequency of 20 kHz along with its second harmonic at 40 kHz. The 20 KHz wave provides bulk material shaping and energy transfer, while the 40 KHz harmonic wave enables fine surface detailing. For instance, when molding a complex polymer part, the 20 kHz wave might be used to control overall material flow and distribution, while the 40 KHz harmonic wave simultaneously molds intricate surface features with sub-millimeter precision. This combination allows the system to simultaneously manage both macro-scale shaping and micro-scale surface finishing in a single process. Additionally, the system may employ custom acoustic waveforms, such as a chirped pulse sequence that sweeps from 15 kHz to 45 kHz over a 50 ms duration. This chirped waveform can be used to systematically interact with different scales of the material structure, from large polymer chains to small additive particles, optimizing the molding process across various material compositions.

The process may also involve varying the pulse duration and repetition rate of the acoustic waves to achieve different effects. In a multi-modal implementation, the system might utilize a combination of short, high-intensity pulses at 50 kHz with a duration of 0.1 ms and a repetition rate of 1 kHz, alongside longer, sustained pulses at 10 KHz with a duration of 5 ms and a repetition rate of 100 Hz. The short, high-frequency pulses can be used for initial rapid shaping of the material, such as quickly defining the edges of a printed layer in a metal powder sintering process and for precise shaping of fine features, such as creating sharp edges or intricate surface textures in a polymer printing process. Simultaneously, the longer, low-frequency pulses can provide sustained pressure for bulk material redistribution and void elimination. For example, when printing a complex part with both fine details and large structural elements, the system dynamically adjusts these pulse parameters based on real-time feedback. If high-resolution cameras detect a slight misalignment in a thin wall structure, the system might increase the repetition rate of the 50 KHz pulses in that specific area to apply rapid, precise acoustic pressure for realignment. Conversely, if void sensors detect a larger internal cavity forming, the system could increase the duration of the 10 KHz pulses to apply sustained acoustic pressure, encouraging material flow to fill the void. This multi-modal, adaptive pulsing strategy ensures optimal control over material placement and shape throughout the printing process, enabling the system to handle a wide range of geometries with high precision, from delicate features to robust structures.

In a specific embodiment of the present invention, a method for controlled molding of materials in a non-solid state is disclosed, wherein the application of acoustic pressure 110 is localized to an area less than or equal to the dimensions of the material, and in the specific embodiment as illustrated in FIG. 4 a material in a non-solid state 112. This localized approach to acoustic manipulation enables the creation of complex structures with varying densities, mechanical properties, and compositions, while mitigating the challenges associated with patterning the entire 2D or 3D shape using acoustics alone. The method involves selectively applying acoustic pressure to specific regions of the material, allowing for the fabrication of functionally graded materials, composite materials with unique properties, and multi-material objects. This technique can be integrated with other manufacturing methods, such as stereolithography or selective laser sintering, to enhance the efficiency and precision of the overall process. Additionally, the localized acoustic pressure approach enables in-situ repair or modification of existing parts and can be employed in the field of bioprinting for creating complex tissue structures with high fidelity. The ability to handle materials with different properties and behaviors, such as high viscosity or low surface tension, is facilitated by adjusting the localized acoustic pressure to provide the necessary force to overcome these material characteristics. Furthermore, the scalability of this method is enhanced by focusing the acoustic energy on smaller regions of the material, reducing the complexity and computational burden of the molding process compared to methods that attempt to pattern the entire shape using acoustics.

To optimize the 3D printing process, Step 206 (in FIG. 2) may optionally control a rate of solidification of the dispensed material 102, or in a specific embodiment, the material in a non-solid state 112. This allows for tailored solidification dynamics suited to varying design requirements and material properties. The rate of solidification can be controlled by adjusting the temperature of the material, the intensity of the acoustic waves 116, the composition of the surrounding medium 118, the properties of the print platform 104 (e.g., temperature, surface finish, or material), or any other parameter that affects the phase transition of the material. The control of the solidification rate can be based on predefined profiles, real-time sensor data, or user input. In some embodiments, the system may incorporate a heated print platform 104 configured to regulate the temperature of the material and control the solidification rate.

In various embodiments of the present invention, the system and method for controlled molding and solidification of materials in a non-solid state further comprises a stimulative means to control the rate of solidification of the material. This stimulative means can take several forms, each designed to enhance the control over the solidification process and enable the creation of materials with desired properties and characteristics.

One embodiment of the stimulative means involves the use of electromagnetic radiation, such as ultraviolet (UV), visible, or infrared (IR) light. By selectively exposing the material to specific wavelengths and intensities of light, the rate of solidification can be controlled. For example, in a photopolymerization process, the intensity and duration of UV light exposure can be modulated to control the degree of crosslinking and, consequently, the rate of solidification. This approach is particularly useful for materials that undergo photoinitiated solidification, such as photopolymers and light-activated resins.

Another embodiment of the stimulative means involves the use of thermal energy to control the rate of solidification. By selectively applying heat to specific regions of the material, the rate of solidification can be accelerated or decelerated. This can be achieved through the use of focused laser beams, plasma arcs, infrared lamps, inductive or resistive heating elements. Conversely, the rate of solidification can also be controlled by selectively cooling specific regions of the material. This can be accomplished by blowing cold gas, such as inert gas (e.g., nitrogen or argon) or air, onto the material surface or by using thermoelectric cooling elements. Thermal stimulation is particularly effective for materials that undergo temperature-dependent phase transitions, such as thermoplastics and thermosets. By precisely controlling the temperature profile during the solidification process, the material properties, such as crystallinity, density, and mechanical strength, can be tailored to meet specific requirements.

A third embodiment of the stimulative means involves the use of chemical agents to control the rate of solidification. This can be achieved by introducing catalysts, initiators, or crosslinking agents into the material at specific times and locations. These chemical agents can be delivered through various methods, such as inkjet printing, microfluidic channels, or localized injection. By controlling the concentration and distribution of these chemical agents, the rate of solidification can be selectively modulated. This approach is particularly useful for materials that undergo chemically-induced solidification, such as two-part epoxies, silicones, and polyurethanes.

In addition to these embodiments, other stimulative means can be employed to control the rate of solidification, such as electric or magnetic fields, ultrasound, or mechanical vibration. These methods can be used independently or in combination with the aforementioned techniques to achieve precise control over the solidification process.

The integration of stimulative means with the localized acoustic pressure approach enables a controllable and adaptable manufacturing process. By selectively applying acoustic pressure and stimulative energy to specific regions of the material, complex structures with spatially varying properties can be created. This level of control is essential for producing functionally graded materials, multi-material composites, and structures with optimized performance characteristics.

Furthermore, the ability to control the rate of solidification can be leveraged to improve the efficiency and throughput of the manufacturing process. By accelerating the solidification rate in specific regions, the overall production time can be reduced without compromising the quality or precision of the final product. Conversely, by selectively decelerating the solidification rate, the material can be maintained in a non-solid state for extended periods, enabling more complex molding operations or allowing for the integration of additional materials or components.

Step 207 may optionally dispense a different material and apply it to the surface, enabling the production of multi-material objects or complex composite structures within a single printing session. The different material can be dispensed using the same dispensing unit 101 as the material 102 or using a separate dispensing unit. The different material can be in the same state as the material 102 or in a different state, and can be composed of the same substances as the material 102 or different substances. The application of the different material can be performed simultaneously with the dispensing of the material 102 or in a separate step, and can involve the same or different acoustic modulation and solidification processes.

Step 208 may optionally remove a portion of the material after solidification, which is useful for correcting defects 702, achieving high-resolution details and intricate geometries, and removing support structures often necessary for printing overhanging designs. The removal of the material can be performed using various methods, such as mechanical cutting, laser ablation, chemical etching, or any other suitable method that can selectively remove solidified material without damaging the surrounding material. The removal process can be guided by computer-aided design (CAD) models, sensor data, or user input, and can be performed in a single step or in multiple steps.

Furthermore, Step 209 allows for reheating the material to a reconstituted non-solid state and adjusting the acoustic pressure 110 during this phase. This facilitates post-processing modifications such as reshaping or integration with additional layers or materials, enhancing the adaptability and accuracy of the printing process. The reheating of the material can be performed using the same heating source 113 used in Step 204 or a different heating source, and can be localized to specific regions of the printed object or applied to the entire object. The adjustment of the acoustic pressure 110 during the reconstituted non-solid state can be performed using the same acoustic emitter system 105 used in Step 202 or a different acoustic emitter system, and can involve the same or different acoustic modulation parameters.

FIG. 1 presents an overview of a 3D printing system utilizing acoustic modulation. A dispensing unit 101 deposits material 102 through a nozzle 111 onto either a previously deposited layer 103 or a print platform or other solid substrate 104. The nozzle 111 can be a single nozzle or an array of nozzles, and can have various shapes, sizes, and configurations depending on the material being dispensed and the desired characteristics of the deposited material. The dispensing unit 101 can be a pneumatic dispenser, a syringe pump, a screw extruder, an inkjet printhead, an aerosol jet, or any other suitable device that can controllably dispense the material 102. The print platform 104 can be a stationary platform, a movable platform, or a combination thereof, and can have various shapes, sizes, and surface properties, depending on the geometry and the material of the object being printed. In some embodiments, the print platform 104 can be a heated platform configured to regulate the temperature of the material and control the solidification rate. The system builds 3D objects layer by layer and is capable of handling various materials including, but not limited to, metals, polymers, ceramics, composites, bio-inks, hydrogels, and any combination thereof.

Acoustic pressure 110 is employed on the dispensed material 102, or in a specific embodiment, the material in a non-solid state 112 to control flow and solidification, enabling precise molding. The acoustic emitter system 105 generates the acoustic pressure using various types of acoustic waves, including, but not limited to, traveling waves which continuously move through a medium transferring energy; standing waves characterized by fixed nodes and antinodes; pulse waves consisting of single or short bursts of disturbances; sinusoidal waves with a harmonic form; non-linear waves deviating from the principle of superposition due to medium nonlinearities; dispersive and non-dispersive waves where wave speed varies or remains constant across frequencies, respectively; transverse and longitudinal waves where particle displacement occurs perpendicular or parallel to the direction of propagation; and surface waves, such as Rayleigh and Love waves, which travel along the surfaces of solids. The acoustic emitter system 105 can include various types of acoustic transducers, such as piezoelectric transducers, magnetostrictive transducers, electrostatic transducers, or any other suitable transducers that can convert electrical signals into acoustic waves. Traveling waves propagate through a medium and can be manipulated using a phased array configuration, allowing for precise control over phase and amplitude to create localized acoustic pressure 110 through constructive or destructive interference at designated locations. The phased array configuration can include a one-dimensional array, a two-dimensional array, or a three-dimensional array of acoustic transducers, and can be operated in a linear mode, a planar mode, or a volumetric mode. Standing waves, formed by the interference of two traveling waves moving in opposite directions, create nodes and anti-nodes that exert differential pressures on the material. By modifying the frequency, amplitude, phase, position, and spatial orientation of the acoustic emitter system 105, the system enables contactless control over material formation during solidification.

The acoustic emitter system 105 may comprise a single emitter capable of generating both traveling and standing waves or multiple emitters dedicated to producing either type. The emitters can be arranged in various configurations, such as a linear array, a two-dimensional grid, or a three-dimensional lattice, depending on the desired level of control and complexity of the object being printed. The spacing between the emitters can be uniform or non-uniform, and can be optimized for specific material properties and printing conditions. The system may further comprise various acoustic elements, including transducers for generating and detecting acoustic waves 116, reflectors for directing and focusing the waves, and acoustic diffraction gratings for splitting or combining waves of different frequencies. The reflectors can be flat, curved, or any other suitable shape that can manipulate the direction and focus of the acoustic waves 116. The acoustic diffraction gratings can be transmission gratings or reflection gratings, and can have various periods, amplitudes, and profiles depending on the desired frequency and angle of the diffracted waves.

The surrounding medium 118 within which the acoustic waves 116 propagate and exert pressure on the material can be composed of any suitable gas, liquid, semi-solid, solid particles, or a combination thereof. The choice of the surrounding medium may depend on factors such as the material being printed, the desired properties of the final product, and the operating conditions of the 3D printing system. The surrounding medium 118 can be a static medium or a flowing medium, and can be at ambient pressure or at a controlled pressure. The properties of the surrounding medium 118, such as density, viscosity, and acoustic impedance, can be selected to optimize the transmission and focusing of the acoustic waves 116 and the molding of the material.

Deposition of each layer 103 is synchronized with the acoustic emitter system 105, managed by a controller 106 that is part of a computing system 109. This system includes one or more processors 107, a memory 108 linked to at least one processor, and a program instruction set stored in the memory and executed by the processor(s) to perform the steps of dispensing the material, applying acoustic pressure to mold the material, and adjusting the acoustic pressure prior to solidification. The controller 106 can be a general-purpose computer, a special-purpose computer, a microcontroller, a field-programmable gate array (FPGA), an application-specific integrated circuit (ASIC), or any other suitable computing device that can execute the program instruction set. The memory 108 can be a volatile memory, a non-volatile memory, or a combination thereof, and can include random access memory (RAM), read-only memory (ROM), flash memory, or any other suitable storage medium. The program instruction set can be written in any suitable programming language, such as C, C++, Java, Python, or any other high-level, low-level, or domain-specific language.

Real-time monitoring is facilitated by a plurality of sensors 115 integrated into the 3D printing apparatus. In some embodiments, the sensors include cameras 114 that capture the ongoing printing process. The cameras 114 can be visible light cameras, infrared cameras, ultraviolet cameras, x-ray cameras, or any other suitable imaging devices that can provide visual data about the printing process. The visual data can include still images, video streams, or three-dimensional scans of the printed object and the surrounding environment. This information enables the computing system 109 to dynamically modify acoustic waves 116 and other printing parameters, ensuring precise deposition of each material layer in alignment with design specifications. The computing system 109 can use various image processing and computer vision algorithms, such as edge detection, object recognition, or motion tracking, to analyze the visual data and extract relevant information for process control. In a specific embodiment, the system employs a high-speed camera operating at 1000 frames per second, coupled with a thermal imaging camera capturing temperature data at 60 Hz. The high-speed camera provides detailed visual information about the material deposition process, capable of detecting sub-millimeter variations in layer thickness or alignment. Simultaneously, the thermal camera maps temperature gradients across the printing area with a resolution of 0.1° C. For instance, when printing a complex titanium alloy part, the high-speed camera might detect a slight misalignment in the deposition of a thin wall structure. Concurrently, the thermal camera could identify a localized hot spot forming due to uneven heat distribution. This multi-sensory imaging approach enables the computing system to dynamically modify acoustic waves and other printing parameters in real-time. Using advanced image processing algorithms, such as convolutional neural networks for feature recognition and optical flow analysis for motion tracking, the system can extract critical information about the print quality and progress. In this example, the system might adjust the acoustic wave patterns to apply precise pressure for realigning the thin wall while simultaneously modulating the energy input to mitigate the developing hot spot.

The acoustic emitter system 105 generates wave patterns dynamically, drawing on real-time feedback from the sensors 115 to continuously adjust parameters for process optimization. The feedback from the sensors 115 can include temperature data, pressure data, flow data, viscosity data, or any other relevant data that can be used to characterize the state of the material and the progress of the printing process. The real-time feedback can be used to update the computer models and simulations of the printing process, enabling the controller 106 to predict the behavior of the material and the outcome of the printing process. The controller 106 can then use the updated models and simulations to generate new control signals for the acoustic emitter system 105, the dispensing unit 101, and other components of the 3D printing system, in order to optimize the printing process and achieve the desired properties of the final product. In a particular implementation, the system integrates data from multiple sensor types, including a laser profilometer measuring surface topography with 10-micron accuracy, and a Doppler flow sensor monitoring material viscosity in real-time. For example, when printing a functionally graded material with varying compositions, the profilometer might detect a slight depression forming in a transition zone between two different material compositions. Simultaneously, the flow sensor could indicate an increase in viscosity in the same area. The controller uses this multi-modal feedback to update its computational models, predicting that the depression could lead to a void if left uncorrected, and that the increased viscosity might exacerbate the issue. In response, the controller generates new control signals for the acoustic emitter system, perhaps increasing the amplitude of low-frequency waves to encourage material flow into the depression while adjusting the phase of high-frequency waves to optimize surface tension and prevent material slumping. Concurrently, it might modify the dispensing unit parameters, slightly increasing the temperature of the deposited material to reduce viscosity in the problematic area. This comprehensive approach to real-time monitoring and control ensures that the system can adapt to complex, dynamic printing scenarios, optimizing the process on-the-fly to achieve the desired properties of the final product.

The system may optionally incorporate a heated print platform 104 to regulate material temperatures and promote strong interlayer adhesion. The heated print platform 104 can be a resistive heating platform, an inductive heating platform, a radiative heating platform, or any other suitable heating platform that can maintain the print platform at a desired temperature. The temperature of the heated print platform 104 can be controlled by the controller 106 based on feedback from temperature sensors embedded in the platform or in the material being printed. The heated print platform 104 can be stationary or movable, and can have various shapes, sizes, and surface finishes depending on the material being printed and the desired characteristics of the final product.

Additionally, the system may comprise at least one additional heating source 113 for heating the material to a desired temperature or into a non-solid state 112. The heating source 113 can be in the form of a laser, a plasma arc, an electron beam, an infrared heater, a resistive heater, a microwave heater, an induction heater, a hot air blower, or any other suitable heating device capable of adjusting the temperature of the material or transitioning the material into a non-solid state. The heating source 113 can be a single source or an array of sources, and can be stationary or movable relative to the material being printed. The heating source 113 can have various power levels, spot sizes, and scanning patterns, and can be operated in a continuous mode or a pulsed mode. The operation of the heating source 113 can be synchronized with the operation of the dispensing unit 101 and the acoustic emitter system 105 by the controller 106 to ensure optimal heating and molding of the material.

FIG. 5A, 5B demonstrate the process of adjusting acoustic pressure by modifying the emitted patterns of the acoustic waves 116. This adjustment can be applied to various parameters of the acoustic emitter system 105, including, but not limited to, phase, amplitude, frequency, position, and spatial orientation. The phase of the acoustic waves 116 can be adjusted to control the position and intensity of the constructive and destructive interference patterns that shape the material. The amplitude of the acoustic waves 116 can be adjusted to control the magnitude of the acoustic pressure applied to the material, which affects the degree of shaping and the rate of solidification. The frequency of the acoustic waves 116 can be adjusted to control the size and spacing of the nodes and anti-nodes in the standing wave pattern, which determines the resolution and feature size of the printed object. The position and spatial orientation of the acoustic emitter system 105 can be adjusted to control the direction and focus of the acoustic waves 116, which affects the geometry and uniformity of the printed object.

In FIG. 5A, the initial configuration of the acoustic emitter system 105 generates a specific pattern of acoustic waves 116. The controller 106 continuously monitors and analyzes feedback data to optimize the molding and distribution of the material during the deposition and solidification process. For instance, in a specific embodiment printing a complex polymer part with varying thickness, the system employs a multi-sensor array including high-speed cameras and laser profilometers. As the printing progresses, the high-speed cameras detect that on the thinner sections of the part, the material is slightly overspreading beyond the intended boundaries. Simultaneously, the laser profilometer identifies that in thicker sections, small depressions are forming due to insufficient material distribution. The controller 106 processes this group of data using machine learning algorithms, such as gradient descent or reinforcement learning, trained on previous print data. The algorithm predicts that if left uncorrected, these issues could lead to dimensional inaccuracies and potential structural weaknesses. To address this, the controller determines the optimal adjustments to the acoustic emitter system 105. It calculates that increasing the amplitude of high-frequency (e.g., 50 kHz) acoustic waves in the thin sections by 15% would create a more focused acoustic pressure field, effectively containing the material spread. For the thicker sections, it determines that applying lower frequency (e.g., 10 kHz) waves with a 30% amplitude increase would generate broader acoustic pressure, encouraging material flow to fill the depressions. The controller 106 implements these changes by sending updated control signals to the acoustic emitter system 105, dynamically adjusting the wave patterns to reshape and redistribute the material as needed. This real-time, data-driven approach ensures optimal material placement and molding throughout the printing process, adapting to changing conditions to maintain part accuracy and structural integrity.

In FIG. 5B, the system dynamically adjusts the acoustic wave patterns based on real-time data to enhance the precision and quality of the material deposition. The adjustment of the acoustic wave patterns can be performed by changing the control signals sent to the individual emitters in the acoustic emitter system 105, such as changing the phase, amplitude, or frequency of the electrical signals driving the emitters. The adjustment can also be performed by physically moving or reorienting the emitters, such as by using piezoelectric actuators or servo motors. The fine-tuning of acoustic wave parameters allows for precise control over the material molding process, ensuring a smooth transition of the dispensed material 102, or in a specific embodiment, the material in a non-solid state 112 into its desired solid form, even under varying material properties and environmental conditions. The dynamic adjustment of the acoustic wave patterns can compensate for any disturbances or variations in the printing process, such as changes in the material properties, fluctuations in the ambient temperature or pressure, or errors in the dispensing or positioning of the material.

FIG. 6A, 6B illustrate the integration of sensors or imaging devices for real-time monitoring of the deposition process. In this embodiment, material in a non-solid state 112 is dispensed onto a solid surface, such as a previously printed layer 103, while acoustic waves 116 generated by an acoustic emitter system 105 are simultaneously applied to shape the material. The sensors or imaging devices can be positioned at various locations around the printing area, such as above, below, or to the sides of the material being printed. The sensors or imaging devices can be fixed or movable, and can be operated in a passive mode or an active mode. In the passive mode, the sensors or imaging devices simply capture data about the printing process without interacting with the material or the acoustic waves. In the active mode, the sensors or imaging devices can emit signals, such as light, sound, or electromagnetic waves, to probe the material and the acoustic waves, and then measure the response to those signals.

A plurality of sensors 115 capture real-time data regarding the deposition process. The sensors 115 can include, but are not limited to, temperature sensors, pressure sensors, flow sensors, viscosity sensors, acoustic sensors, optical sensors, cameras 114 or any other suitable sensors that can measure relevant properties of the material and the printing environment. The temperature sensors can be thermocouples, thermistors, infrared sensors, or any other suitable temperature measurement devices. The pressure sensors can be piezoelectric sensors, capacitive sensors, or any other suitable pressure measurement devices. The flow sensors can be ultrasonic flow meters, thermal flow meters, or any other suitable flow measurement devices. The viscosity sensors can be rotational viscometers, vibrational viscometers, or any other suitable viscosity measurement devices. The acoustic sensors can be microphones, hydrophones, or any other suitable acoustic measurement devices. The optical sensors can be photodiodes, phototransistors, or any other suitable optical measurement devices.

As shown in FIG. 6A, this data is fed back to the controller 106, which dynamically adjusts the parameters of the acoustic waves 116, such as phase, amplitude, frequency, position, and spatial orientation, based on the received data, as shown in FIG. 6B. The controller 106 can use various signal processing and control algorithms, such as Fourier analysis, wavelet analysis, or proportional-integral-derivative (PID) control, to analyze the sensor data and generate the appropriate control signals for the acoustic emitter system 105. The dynamic adjustment of the acoustic wave parameters can be performed in real-time, with a response time that is faster than the time scale of the relevant physical processes, such as the solidification of the material or the movement of the print head. This real-time feedback and control loop allows the system to adapt to changing conditions and maintain optimal performance throughout the printing process.

In some embodiments, the plurality of sensors includes a camera 114 that provides visual feedback to enhance the precision of the adjustments made by the controller 106. The camera 114 can capture images or videos of the material being printed, showing the shape, size, and position of the deposited material, as well as any defects or irregularities in the printed object. The controller 106 can use image processing algorithms, such as edge detection, object recognition, or template matching, to analyze the visual feedback and determine the necessary adjustments to the acoustic wave parameters. For example, if the visual feedback shows that the deposited material is not conforming to the desired shape, the controller 106 can adjust the phase or amplitude of the acoustic waves to apply more or less pressure to specific regions of the material, in order to correct the shape. Similarly, if the visual feedback shows that the printed object has defects or irregularities, such as voids, cracks, or rough surfaces, the controller 106 can adjust the frequency or position of the acoustic waves to smooth out the material and eliminate the defects.

This real-time monitoring and dynamic adjustment capability ensures accurate deposition of each material layer, conforming to the desired geometric and mechanical specifications, thus enhancing the overall quality and reliability of the 3D printed objects. The integration of sensors and imaging devices allows the system to detect and correct errors or deviations from the intended design in real-time, without requiring manual intervention or post-processing steps. This not only improves the efficiency and repeatability of the printing process, but also enables the production of more complex and precise structures that would be difficult or impossible to achieve with traditional manufacturing methods. Furthermore, the ability to monitor and control the printing process in real-time allows for greater flexibility and adaptability, as the system can respond to changes in the material properties, environmental conditions, or design specifications on the fly, without requiring extensive recalibration or reprogramming.

FIG. 7A, 7B, 7C depict the integration of a localized heating source to refine the deposition and solidification of a material in the 3D printing process. The localized heating source can be used to selectively heat specific regions of the material being printed, in order to control the local temperature, viscosity, and solidification rate of the material. This selective heating capability allows the system to optimize the printing process for different materials, geometries, and feature sizes, and to achieve higher resolution and smoother surfaces than would be possible with uniform heating alone.

The material being printed can be a defective or erroneous print 702, in contrast to the desired design 703. The defective or erroneous print 702 can be caused by various factors, such as incorrect material properties, improper dispensing or molding of the material, or disturbances in the printing environment. In some embodiments, 702 could be an existing feature of the substrate or a previously printed layer 103, which needs to be modified or corrected in order to achieve the desired design 703. At least one additional heating source 701, such as a laser, a plasma arc, an electron beam, an infrared heater, a resistive heater, a microwave heater, an induction heater, a hot air blower, or any other suitable heating device, provides localized heating 704 to the material. The localized heating 704 can be applied to the entire defective or erroneous print 702, or to specific regions or features of the print that need to be modified. The heating source 701 can be positioned above, below, or to the side of the material being printed, and can be stationary or movable relative to the material. The heating source 701 can have various power levels, spot sizes, and scanning patterns, and can be operated in a continuous mode or a pulsed mode.

The localized heating 704 provided by the heating source 701 can serve several purposes. First, it can adjust the temperature of the material to a desired value, allowing for precise control over the material properties and behavior during the printing process. Second, it can raise the temperature of the material above its melting point or softening point, allowing the material to be reshaped or redistributed by the acoustic waves 116. Third, it can reduce the viscosity of the material, making it easier to flow and conform to the desired shape under the influence of the acoustic waves 116. Fourth, it can control the solidification rate of the material, by keeping the material at a desired temperature for a longer or shorter period of time, depending on the desired properties of the final object.

The localized heating 704 reconstitutes the material into a non-solid state 112 after initial solidification. The reconstitution of the material can be complete, wherein the entire defective or erroneous print 702 is melted or softened back into a fully non-solid state, or it can be partial, wherein only certain regions or features of the print are melted or softened, while other regions remain solid. The reconstitution of the material can be controlled by adjusting the power level, duration, and scanning pattern of the heating source 701, as well as by adjusting the frequency, amplitude, and phase of the acoustic waves 116 that are used to mold the material.

Subsequently, acoustic pressure 110 is applied by an acoustic emitter system 105 to the material in the reconstituted state until the material solidifies into the desired form 301. The application of acoustic pressure 110 can be continuous or pulsed, and can be varied in magnitude, direction, and spatial distribution, depending on the desired shape and properties of the final object. The solidification of the material can be induced by turning off or reducing the power of the heating source 701, by increasing the cooling rate of the material, or by exposing the material to a curing agent or a crosslinking agent.

This process of localized reconstitution and reshaping of the material can be guided by CAD specifications or machine vision, which provide information about the desired design 703 and the actual state of the printed object. The CAD specifications can be in the form of 3D models, 2D drawings, or numerical control codes that define the geometry, dimensions, and tolerances of the desired object. The machine vision can be provided by cameras, sensors, or other imaging devices that capture the shape, size, and position of the printed object in real-time, and compare it to the CAD specifications.

The integration of localized heating and acoustic modulation allows for enhanced control over material properties and geometries, enabling the system to produce high-quality, accurately formed 3D printed objects with smooth surfaces and fine features. The ability to reconstitute and reshape the material after initial solidification provides a means to correct defects, modify designs, and add new features to the printed object, without having to start the printing process from scratch. This flexibility and adaptability can greatly reduce the time, cost, and waste associated with traditional manufacturing methods, and enable the production of more complex and customized objects on demand.

FIG. 8A, 8B, 8C, 8D illustrate a specific embodiment of the method in which solid materials, such as powders 802, are processed using a dual-phase dispensing unit 801. The dual-phase dispensing unit 801 can handle both solid and non-solid materials, and can dispense them simultaneously or sequentially, depending on the desired composition and structure of the final object. This embodiment represents one possible configuration, but the method is applicable to other solid forms of materials as well, such as granules, pellets, fibers, or wires.

The dual-phase dispensing unit 801 can be a single nozzle or an array of nozzles, and can have various designs and configurations, such as a coaxial nozzle, a side-by-side nozzle, or a multi-layer nozzle. The dual-phase dispensing unit 801 can be fed by two or more separate material hoppers or reservoirs, each containing a different type of material in a different state. For example, one hopper may contain a solid powder material 802, while another hopper may contain a liquid binder material or a gas propellant. The materials from the different hoppers can be mixed or combined in the nozzle of the dual-phase dispensing unit 801, or they can be dispensed separately and then mixed or combined on the print bed.

The solid powder material 802 can be a metal powder, a ceramic powder, a polymer powder, or any other suitable powder material that can be used for 3D printing.

The metal powder can be a pure metal, such as titanium, aluminum, or copper, or it can be a metal alloy, such as stainless steel, Inconel, or cobalt chrome. The ceramic powder can be an oxide, such as alumina or zirconia, or a non-oxide, such as silicon carbide or silicon nitride. The polymer powder can be a thermoplastic, such as ABS, PLA, or nylon, or a thermoset, such as epoxy or polyurethane.

The acoustic emitter system 105 generates acoustic waves 116 that effectively manipulate and position the powders 802 dispensed by the dual-phase dispensing unit 801. The acoustic waves 116 can be used to control the trajectory, velocity, and spatial distribution of the powder particles, as well as to compact and densify the powder bed. The acoustic waves 116 can also be used to selectively agitate or fluidize the powder particles, in order to improve their flowability and packing density.

The manipulation and positioning of the powder particles by the acoustic waves 116 can be achieved through various mechanisms, such as acoustic radiation pressure, acoustic streaming, or acoustic levitation. Acoustic radiation pressure is a nonlinear effect that arises from the interaction between the acoustic waves and the powder particles, and can generate forces that push the particles in the direction of the sound propagation. Acoustic streaming is a steady flow of fluid that is induced by the absorption of acoustic energy, and can generate vortices or currents that carry the powder particles along. Acoustic levitation is a phenomenon where the powder particles are suspended in a standing wave field, and can be held in stable positions or moved around by adjusting the phase or amplitude of the acoustic waves.

Subsequent heating by at least one additional heating source 701, which can be in the form of a laser, a plasma arc, an electron beam, an infrared heater, a resistive heater, a microwave heater, an induction heater, a hot air blower, or any other suitable heating device, transitions the powders from a solid to a non-solid state 112. The heating source 701 can be positioned above, below, or to the side of the powder bed, and can be stationary or movable relative to the powder bed. The heating source 701 can have various power levels, spot sizes, and scanning patterns, and can be operated in a continuous mode or a pulsed mode.

The transition of the powder material from a solid to a non-solid state 112 can occur through various mechanisms, such as melting, sintering, or binder jetting. Melting involves heating the powder material above its melting point, causing the powder particles to fuse together and form a dense, fully-dense part. Sintering involves heating the powder material below its melting point, but above a critical temperature where the powder particles can bond together and form a solid, porous part. Binder jetting involves selectively depositing a liquid binder material onto the powder bed, which glues the powder particles together and forms a green part that can be subsequently sintered or infiltrated with another material.

The method includes a step for adjusting the acoustic pressure 110 exerted on the material in its non-solid state 112. This adjustment can be performed by modulating the frequency, amplitude, phase, position, spatial orientation, or direction of the acoustic waves 116 generated by the acoustic emitter system 105. The adjustment of the acoustic pressure 110 can be based on feedback from sensors or imaging devices that monitor the state of the material and the progress of the printing process, as described earlier.

The precise control of acoustic pressure 110 facilitates the molding of the material into a predetermined form while maintaining structural integrity during solidification, resulting in the desired form 301. The molding of the material can involve shaping, smoothing, densifying, or otherwise modifying the geometry and microstructure of the material, in order to achieve the desired mechanical, thermal, electrical, or optical properties of the final object. The structural integrity of the material during solidification can be maintained by controlling the cooling rate, the temperature gradient, and the internal stresses of the material, as well as by applying additional support structures or reinforcements as needed.

This controlled application of acoustic and thermal energies illustrates the system capacity to manage different material states and achieve desired geometrical accuracies and material properties. The ability to process solid powder materials directly, without the need for pre-processing or post-processing steps, can greatly simplify and accelerate the 3D printing workflow, and enable the production of more complex and diverse objects with tailored properties. The use of acoustic waves to manipulate and position the powder particles can also improve the resolution, surface finish, and dimensional accuracy of the printed objects, by providing a high degree of control over the powder bed density and the melt pool dynamics.

FIG. 9A and FIG. 9B depict the integration of subtractive machining tools into the 3D printing process, allowing for the refinement and modification of deposited materials. Subtractive machining involves the selective removal of material from a solid workpiece, using mechanical, thermal, or chemical means, in order to achieve the desired shape, size, or surface finish of the final object. The integration of subtractive machining tools into the 3D printing process can complement the additive nature of 3D printing, and enable the production of objects with higher accuracy, smoother surfaces, and more intricate features.

This hybrid additive-subtractive process can be guided by CAD specifications or machine vision, which provide information about the desired design 703 and the actual state of the printed object. The CAD specifications can be in the form of 3D models, 2D drawings, or numerical control codes that define the geometry, dimensions, and tolerances of the desired object. The machine vision can be provided by cameras, sensors, or other imaging devices that capture the shape, size, and position of the printed object in real-time, and compare it to the CAD specifications.

In one embodiment, a defective or erroneous print 702, which deviates from the desired design 703, is built atop a previously printed layer 103 or on any solid surface, such as a substrate of any suitable material or a dedicated print bed 104. The defective or erroneous print 702 can be caused by various factors, such as incorrect material properties, improper dispensing or molding of the material, or disturbances in the printing environment. In some embodiments, 702 could be an existing feature of the substrate or a previously printed layer 103, which needs to be modified or corrected in order to achieve the desired design 703.

In one particular embodiment, a subtractive machining tool 903, such as a milling bit, a grinder, a laser cutter, a water jet cutter, an electrical discharge machining (EDM) device, or any other suitable machining tool, is used to machine the defective or erroneous print 702 so that it conforms to the desired design 703. The subtractive machining tool 903 can be positioned above, below, or to the side of the printed object, and can be stationary or movable relative to the printed object. The subtractive machining tool 903 can have various sizes, shapes, and configurations, depending on the material being machined and the desired features of the final object.

The machining of the defective or erroneous print 702 can involve various operations, such as cutting, drilling, grinding, polishing, or engraving, depending on the nature of the defect and the desired correction. For example, if the defect is a protrusion or an overhang, the subtractive machining tool 903 can be used to cut or grind away the excess material, until the surface of the printed object matches the desired design 703. If the defect is a void or a depression, the subtractive machining tool 903 can be used to fill or level the affected area, by depositing additional material or by smoothing out the surrounding material.

The machining operation can be performed in a single pass or in multiple passes, depending on the depth and complexity of the defect, and the precision and surface finish required for the final object. The machining parameters, such as the tool speed, feed rate, and depth of cut, can be adjusted based on the material properties and the desired results. The machining operation can also be combined with additional heating or cooling steps, to control the temperature and solidification of the material being machined.

The integration of subtractive machining tools into the 3D printing process allows for the efficient correction of defects and the precise finishing of printed objects, without the need for manual intervention or separate post-processing steps. This can greatly reduce the time, cost, and waste associated with traditional manufacturing methods, and enable the production of high-quality, custom-designed objects with tight tolerances and smooth surfaces. The hybrid additive-subtractive process can also expand the range of materials and geometries that can be printed, by allowing for the selective removal or modification of material in specific regions of the printed object. The versatility of the dispensing unit is emphasized through its ability to manage various materials, allowing for the creation of composite objects via simultaneous deposition of multiple material types. FIG. 10 demonstrates an embodiment incorporating a plurality of feed mechanisms 1001, which include at least two dispensing units 101, each capable of dispensing different material types concurrently. These materials can exist in any state, including, but not limited to, liquid, solid, semi-solid, gaseous, or plasma. The different material types can have different chemical compositions, physical properties, or functional characteristics, and can be selected based on the desired properties and performance of the final object.

For example, one dispensing unit 101 may dispense a structural material, such as a metal, ceramic, or polymer, which provides the main body and mechanical strength of the object. Another dispensing unit 101 may dispense a functional material, such as a conductive, insulating, or magnetic material, which provides specific electrical, thermal, or magnetic properties to the object. Yet another dispensing unit 101 may dispense a support material, such as a sacrificial polymer or a water-soluble material, which provides temporary support for overhanging or hollow features during the printing process, and can be removed afterwards.

The dispensing units 101 can have various designs and configurations, such as nozzles, syringes, or extruders, and can be arranged in different spatial patterns, such as a linear array, a circular array, or a grid array. The dispensing units 101 can be fed by separate material hoppers or reservoirs, or they can share a common material source with multiple outlets. The dispensing units 101 can also have different sizes, shapes, and orientations, depending on the material being dispensed and the desired geometry of the object.

The controller 106 coordinates and synchronizes the operations of the dispensing units 101 to ensure precise deposition and integration of the different material types. The controller 106 can control the timing, duration, and sequence of the dispensing operations, as well as the position, velocity, and trajectory of the dispensing units 101 relative to the print bed or the previously printed layers. The controller 106 can also adjust the flow rate, temperature, and pressure of the materials being dispensed, based on feedback from sensors or imaging devices that monitor the printing process. The coordination and synchronization of the dispensing units 101 by the controller 106 enables the creation of multi-material objects with complex geometries, tailored properties, and integrated functionalities. For example, the controller 106 can cause the dispensing units 101 to alternate or interleave the deposition of different materials in specific patterns or gradients, such as a checkerboard pattern, a striped pattern, or a radial pattern. This can result in objects with anisotropic or heterogeneous properties, such as objects with different stiffness, density, or porosity in different regions or directions.

The controller 106 can also cause the dispensing units 101 to co-deposit different materials in a single location or feature, such as a junction, an interface, or a composite layer. This can result in objects with enhanced or synergistic properties, such as objects with improved adhesion, compatibility, or load transfer between different materials. The controller 106 can further cause the dispensing units 101 to selectively deposit different materials in different regions or features of the object, such as a core, a shell, a lattice, or a hinge. This can result in objects with optimized or customized properties, such as objects with high strength-to-weight ratio, high toughness, or high flexibility.

Figures 11, 12:
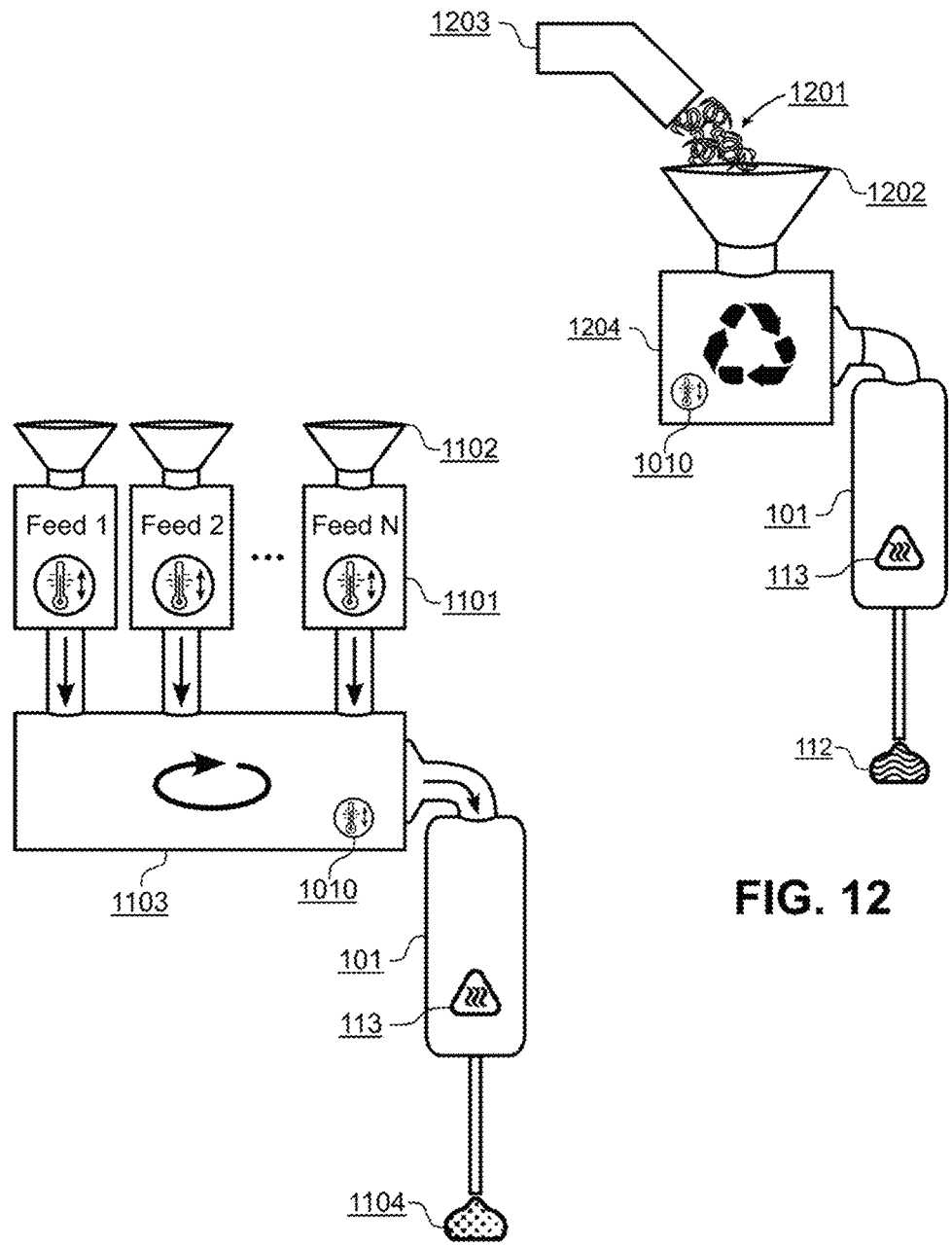
FIG. 11 illustrates a system for additive manufacturing that facilitates the simultaneous management and processing of diverse material types, comprising feed mechanisms, material collection units, temperature control units, a mixing chamber, and a dispensing unit for extruding composite materials.
FIG. 12 depicts an embodiment of an automated collection and recycling system for additive manufacturing processes, illustrating the receipt of material residues, filtering and pre-processing, material reconstitution, and extrusion of reconstituted materials.

The precise deposition and integration of multiple material types by the coordinated and synchronized dispensing units 101 can enable the production of functionally graded materials, multi-phase composites, and 3D printed electronics, among other applications. This can greatly expand the design space and the performance envelope of 3D printed objects, and enable the creation of novel and innovative products with unprecedented capabilities. FIG. 11 presents a system configured for additive manufacturing that facilitates the simultaneous management and processing of diverse material types. This system offers a comprehensive and integrated approach to multi-material 3D printing, by combining the functions of material preparation, mixing, dispensing, and post-processing in a single platform.

The system comprises a plurality of feed mechanisms 1101, each interfacing with dedicated material collection units 1102 that are capable of selectively filtering and pre-processing various materials. The feed mechanisms 1101 can have various designs and configurations, such as hoppers, reservoirs, or cartridges, and can be adapted to handle materials in different states, such as powders, pellets, filaments, or liquids. The feed mechanisms 1101 can also have different sizes, shapes, and capacities, depending on the type and amount of material being processed.

The material collection units 1102 can be equipped with various filtering and pre-processing devices, such as sieves, screens, cyclones, or separators, which can remove impurities, contaminants, or oversize particles from the raw materials. The material collection units 1102 can also be equipped with various sensors or analyzers, such as moisture sensors, particle size analyzers, or composition sensors, which can measure and monitor the properties and quality of the materials being processed.

The feed mechanisms 1101 are equipped with temperature control units 1010, designed to precisely regulate the temperature of the materials to ensure optimal processing conditions. The temperature control units 1010 can be in the form of heating elements, cooling elements, or a combination thereof, and may employ various temperature control methods, such as resistive heating, inductive heating, thermoelectric cooling, or any other suitable method. The temperature control units 1010 can be integrated into the feed mechanisms 1101, or they can be separate units that are attached or connected to the feed mechanisms 1101.

The temperature regulation of the materials by the temperature control units 1010 can serve several purposes, such as: (1) adjusting the rheological properties of the materials, such as viscosity, flowability, or wettability, to facilitate their transport, mixing, and dispensing; (2) inducing physical or chemical changes in the materials, such as melting, softening, curing, or crosslinking, to enable their processing or functionalization; (3) preventing unwanted reactions or degradation of the materials, such as oxidation, hydrolysis, or decomposition, during storage or handling; and (4) ensuring consistent and reproducible material properties, such as density, porosity, or mechanical strength, by maintaining a uniform temperature history.

Materials in various states, such as liquid, solid, semi-solid, gaseous, or plasma, are conveyed into a mixing chamber 1103 by the feed mechanisms 1101. The mixing chamber 1103 can have various designs and configurations, such as a static mixer, a dynamic mixer, or a planetary mixer, and can be adapted to handle materials with different viscosities, densities, or miscibilities. The mixing chamber 1103 can also be equipped with various agitation or dispersion devices, such as impellers, baffles, or ultrasonic transducers, which can break up agglomerates, create turbulence, or induce cavitation in the materials being mixed.

The mixing chamber 1103 incorporates a temperature control unit 1010 to maintain the mixture at a predetermined temperature, facilitating a consistent and controlled blending of materials to achieve uniform material properties. The temperature control unit 1010 in the mixing chamber 1103 can be similar to or different from the temperature control units 1010 in the feed mechanisms 1101, depending on the specific requirements of the materials and the process. The temperature control unit 1010 in the mixing chamber 1103 can also be used to control the rate and extent of any chemical reactions or phase transformations that may occur during mixing, such as polymerization, crystallization, or gelation.

Subsequently, the homogeneously blended materials are directed to a dispensing unit 101, which includes a heating source 113 to further modulate the temperature of the materials as required for effective deposition. The dispensing unit 101 can have various designs and configurations, such as a nozzle, a syringe, or an extruder, and can be adapted to handle materials with different rheological properties or deposition requirements. The dispensing unit 101 can also be equipped with various flow control or shaping devices, such as valves, gates, or dies, which can regulate the flow rate, size, or geometry of the materials being deposited.

The heating source 113 in the dispensing unit 101 can be in the form of a laser, a plasma arc, an electron beam, an infrared heater, a resistive heater, a microwave heater, an induction heater, a hot air blower, or any other suitable heating device. The heating source 113 can be used to adjust the temperature of the materials being dispensed, in order to: (1) maintain their flowability or deformability during deposition; (2) induce their solidification or curing after deposition; (3) create a temperature gradient or a heat-affected zone around the deposition area, to control the microstructure or the properties of the deposited materials; and (4) preheat the substrate or the previously deposited layers, to improve the adhesion or the bonding between the deposited materials.

The dispensing unit 101 is responsible for accurately extruding the composite material 1104 onto a designated build platform or substrate, conforming to the prescribed geometric specifications of the manufactured object. The dispensing unit 101 can be mounted on a multi-axis motion system, such as a gantry, a robotic arm, or a hexapod, which can provide the necessary degrees of freedom and precision for the deposition process. The motion system can be controlled by the controller 106, based on the CAD model or the machine code of the object being printed, as well as feedback from sensors or imaging devices that monitor the printing process.

The dispensing unit 101 can deposit the composite material 1104 in a layer-by-layer fashion, building up the object from the bottom to the top, or in a vector-by-vector fashion, following a predefined path or trajectory. The dispensing unit 101 can also deposit the composite material 1104 in a continuous or a discontinuous mode, depending on the desired resolution, speed, or quality of the printed object. The continuous mode can produce smoother and denser objects, but may require more precise control and synchronization of the material flow and the motion system. The discontinuous mode can produce more complex and porous objects, but may be prone to defects or inconsistencies due to the start-stop nature of the deposition process.

The composite material 1104 can have various compositions, properties, and functionalities, depending on the specific materials and the mixing ratios used. For example, the composite material 1104 can be a polymer-metal composite, a ceramic-metal composite, a polymer-ceramic composite, or a polymer-polymer composite, among others. The composite material 1104 can also have various filler types, sizes, and distributions, such as particles, fibers, or nanomaterials, which can enhance its mechanical, thermal, electrical, or optical properties. The composite material 1104 can further have various additives or modifiers, such as plasticizers, stabilizers, or colorants, which can improve its processability, stability, or aesthetics.

The system illustrated in FIG. 11 enables the precise control and optimization of the material composition, properties, and performance, by providing a high degree of flexibility and automation in the material preparation, mixing, and dispensing processes. The integration of temperature control units 1010, material collection units 1102, and heating sources 113 allows for the efficient and reliable processing of a wide range of materials, from common polymers and metals to advanced ceramics and composites. The ability to blend and dispense multiple materials simultaneously or sequentially, with tailored properties and functionalities, can greatly expand the design space and the application potential of additive manufacturing.

FIG. 12 illustrates an embodiment of an automated collection and recycling system 1204 designed for additive manufacturing processes. This system addresses the issue of material waste and sustainability in 3D printing, by enabling the efficient recovery, reprocessing, and reuse of excess or leftover materials from the printing process. The system commences operation by receiving material residues 1201 through a recycling material feeder 1203, which deposits these residues into a material collection unit 1202. The material residues 1201 can be in various forms, such as powders, particles, filaments, or scraps, and can come from various sources, such as the unbonded or unsintered material from a powder bed fusion process, the support material from a material jetting process, or the trimmed or machined material from a post-processing operation. The material residues 1201 can also have various levels of contamination or degradation, depending on their exposure to the environment, the processing conditions, or the number of recycling cycles.

The recycling material feeder 1203 can have various designs and configurations, such as a hopper, a conveyor, or a pneumatic system, and can be adapted to handle material residues 1201 with different sizes, shapes, or flow properties. The recycling material feeder 1203 can also be equipped with various sensors or detectors, such as level sensors, flow sensors, or metal detectors, which can monitor and control the feeding process, and prevent the introduction of foreign objects or contaminants into the recycling system. The material collection unit 1202 is equipped to handle various types of materials, such as metals, plastics, ceramics, in states including solid, semi-solid, liquid, gaseous, or plasma. The material collection unit 1202 can have various designs and configurations, such as a bin, a tank, or a chamber, and can be adapted to store and process material residues 1201 with different volumes, densities, or reactivities. The material collection unit 1202 can also be equipped with various environmental control devices, such as temperature controllers, humidity controllers, or inert gas purgers, which can maintain the stability and quality of the collected materials, and prevent their degradation or contamination during storage.

The material collection unit 1202 includes filtering and pre-processing capabilities to prepare the materials for recycling, selectively refining the input residues to ensure compatibility with the recycling processes. The filtering and pre-processing capabilities can include various techniques and devices, such as sieving, centrifugation, magnetic separation, or chemical washing, which can remove impurities, contaminants, or undesired fractions from the material residues 1201. The filtering and pre-processing capabilities can also include various characterization and sorting tools, such as optical sensors, X-ray analyzers, or laser-induced breakdown spectrometers, which can identify and classify the material residues 1201 based on their composition, morphology, or properties.

The recycled materials are then transferred to the recycling system 1204, which incorporates a temperature control unit 1010. The recycling system 1204 can have various designs and configurations, such as an extruder, a compounder, or a reactor, and can be adapted to process the recycled materials into a form suitable for reuse in the additive manufacturing process. The recycling system 1204 can also be equipped with various monitoring and control devices, such as pressure sensors, viscometers, or rheometers, which can measure and adjust the properties and quality of the recycled materials during processing.

The temperature control unit 1010 in the recycling system 1204 is responsible for maintaining the temperature within an optimal range to facilitate the reconstitution of materials without degrading their inherent properties. The temperature control unit 1010 can be in the form of heating elements, cooling elements, or a combination thereof, and may employ various temperature control methods, such as resistive heating, inductive heating, thermoelectric cooling, or any other suitable method. The temperature control unit 1010 can also be used to induce or control phase transformations, chemical reactions, or physical changes in the recycled materials, such as melting, solidification, cross-linking, or degradation.

The optimal temperature range for the recycling process can depend on various factors, such as the type and composition of the materials, the desired properties and quality of the recycled materials, and the compatibility with the subsequent additive manufacturing process. For example, for thermoplastic polymers, the optimal temperature range may be above the glass transition temperature but below the degradation temperature, to allow for the softening and reshaping of the polymers without causing excessive chain scission or oxidation. For metals, the optimal temperature range may be above the recrystallization temperature but below the melting temperature, to allow for the restoration of the microstructure and the elimination of residual stresses without causing excessive grain growth or contamination.

Once processed, these recycled materials are directed to a dispensing unit 101, which includes an optional heating source 113 capable of adjusting the temperature of the materials to suit specific deposition requirements. The dispensing unit 101 can have various designs and configurations, such as a nozzle, a syringe, or an extruder, and can be adapted to handle recycled materials with different rheological properties or deposition requirements. The dispensing unit 101 can also be equipped with various flow control or shaping devices, such as valves, gates, or dies, which can regulate the flow rate, size, or geometry of the recycled materials being deposited.

The heating source 113 in the dispensing unit 101 can be in the form of a laser, a plasma arc, an electron beam, an infrared heater, a resistive heater, a microwave heater, an induction heater, a hot air blower, or any other suitable heating device. The heating source 113 can be used to adjust the temperature of the recycled materials being dispensed, in order to: (1) maintain their flowability or deformability during deposition; (2) induce their solidification or curing after deposition; (3) create a temperature gradient or a heat-affected zone around the deposition area, to control the microstructure or the properties of the deposited materials; and (4) preheat the substrate or the previously deposited layers, to improve the adhesion or the bonding between the deposited materials.

The dispensing unit 101 extrudes the reconstituted materials in a desired state onto a build platform or substrate, following precisely defined geometric specifications of the intended manufactured object. The desired state can be a solid state, a non-solid state 112, or any other state suitable for the additive manufacturing process. The non-solid state 112 can be a molten state, a softened state, a viscous state, a gel state, a paste state, a slurry state, or any other state that allows the reconstituted materials to be molded and bonded by the additive manufacturing process. The dispensing unit 101 can deposit the reconstituted materials in a layer-by-layer fashion, building up the object from the bottom to the top, or in a vector-by-vector fashion, following a predefined path or trajectory.

The build platform or substrate can be a stationary platform, a movable platform, or a combination thereof, and can have various shapes, sizes, and surface properties, depending on the geometry and the material of the object being printed. The build platform or substrate can also be equipped with various heating, cooling, or adhesion control devices, such as heating pads, cooling channels, or release coatings, which can regulate the temperature, the flatness, or the stickiness of the deposition surface, and ensure the proper formation and detachment of the printed object.

This automated collection and recycling system 1204 enhances material utilization efficiency and supports sustainable manufacturing practices by enabling the reuse of material residues 1201, thereby reducing waste and minimizing the environmental impact of the additive manufacturing process. The system can also improve the economics and the logistics of additive manufacturing, by reducing the need for virgin materials, the cost of material disposal, and the inventory of unused materials. The system can further enable the closed-loop recycling of materials within a single additive manufacturing process or across multiple processes, by recovering and reprocessing the material residues 1201 into a form compatible with the subsequent deposition and bonding operations.

In some embodiments, the system may include additional features to further enhance its capabilities and versatility. For example, the system may incorporate a vacuum chamber or an inert gas chamber to provide a controlled environment for the recycling and deposition processes, minimizing the influence of atmospheric conditions on the material properties and the quality of the final product. The vacuum chamber can be used to remove air and other gases from the recycling and deposition environments, while the inert gas chamber can be filled with a non-reactive gas, such as nitrogen or argon, to prevent oxidation or other undesired chemical reactions during the recycling and deposition processes.

Furthermore, the system may include a variety of post-processing tools to refine the printed objects made from the recycled materials. These tools may include, but are not limited to, polishing devices, surface treatment equipment, coating applicators, and heat treatment furnaces. Polishing devices, such as abrasive tools or chemical polishing solutions, can be used to smooth the surface of the printed objects, improving their aesthetic appearance and reducing surface irregularities. Surface treatment equipment, such as plasma or chemical etching devices, can be employed to modify the surface properties of the printed objects, enhancing their adhesion, wettability, or biocompatibility. Coating applicators, such as sprayers or dip coaters, can be used to apply protective or functional coatings to the printed objects, improving their durability, corrosion resistance, or other desired properties. Heat treatment furnaces can be utilized to alter the microstructure and mechanical properties of the printed objects, such as increasing their strength, hardness, or ductility through processes like annealing, quenching, or tempering.

In addition to these features, the system may also incorporate advanced process monitoring and control capabilities, to ensure the consistency and reliability of the recycling and deposition processes. This can include the integration of various sensors, such as temperature sensors, pressure sensors, flow sensors, and optical sensors, to monitor the critical parameters of the recycling and deposition processes in real-time. The data collected by these sensors can be analyzed by the controller 106 using advanced algorithms, such as machine learning or artificial intelligence, to identify trends, detect anomalies, and optimize the recycling and deposition processes. The controller 106 can then adjust the process parameters, such as the temperature, pressure, or flow rate, in real-time to ensure the consistent production of high-quality printed objects from the recycled materials.

Moreover, the system may include a user interface that allows operators to easily monitor and control the recycling and deposition processes. The user interface can display real-time process data, such as the temperature, pressure, and material flow rate, as well as the status of the various components of the system. The interface may also allow users to input desired recycling and deposition parameters, select materials, and adjust process variables as needed. In some embodiments, the user interface may include a remote access feature, enabling operators to monitor and control the recycling and deposition processes from a remote location using a computer, tablet, or smartphone.

In conclusion, the automated collection and recycling system 1204 presented in this embodiment provides a comprehensive and sustainable solution for material reuse and waste reduction in additive manufacturing processes. By integrating advanced material handling, processing, and monitoring capabilities, the system enables the efficient recovery, recycling, and reuse of a wide range of materials, from common thermoplastics to high-performance metal alloys and composites. The system can significantly improve the resource efficiency, cost-effectiveness, and environmental footprint of additive manufacturing, while maintaining the quality and performance of the printed objects. As such, this recycling system represents a key enabler for the wider adoption and scalability of additive manufacturing across various industries and applications.

The invention claimed is:

1. A method for molding a material printed by a three-dimensional printing apparatus, comprising:
   dispensing the material from the three-dimensional printing apparatus;
   solidifying the dispensed material;
   heating the material after solidification to a non-solid state;
   dynamically applying acoustic pressure to the material while in the non-solid state; and
   utilizing multi-modal acoustic waves that simultaneously operate at a first frequency and a second frequency, wherein the first frequency differs from the second frequency, to optimize the acoustic molding process.

2. The method of claim 1, wherein the material is dispensed in a serial growth three-dimensional printing process, such that an area of the acoustic pressure applied to the material are localized to be less than or equal to the dimensions of the material in a non-solid state.

3. The method of claim 1, further comprising:
dynamically applying acoustic pressure to different spatial locations across the material to mold the material into a predefined form
prior to the solidification of the material.

4. The method of claim 1, further comprising: removing a portion of the material after solidification of the material.

5. The method of claim 1, further comprising: heating the material into a non-solid state.

6. The method of claim 1, further comprising: controlling a rate of solidification of the material.

7. The method of claim 1, further comprising: analyzing data from a plurality of sensors of the three-dimensional printing apparatus to determine parameters for the adjusting of the acoustic pressure.

8. The method of claim 1, further comprising:
dispensing a different material; and
applying the different material onto the surface.

9. A system for molding a material printed by a three-dimensional printing apparatus, comprising:
a dispensing unit;
a material placed in the dispensing unit;
an acoustic emitter system configured to apply acoustic pressure to the material;
a controller configured to operate the acoustic emitter system;
one or more processors;
a memory coupled to at least one of the processors; and
a set of computer program instructions stored in the memory and executed by at least one of the processors in order to perform actions:
dispensing the material from the three-dimensional printing apparatus;
solidifying the dispensed material;
heating the material after solidification to a non-solid state;
dynamically applying acoustic pressure to the material while in the non-solid state; and utilizing multi-modal acoustic waves that simultaneously operate at a first frequency and a second frequency, wherein the first frequency differs from the second frequency, to optimize the acoustic molding process.

10. The system of claim 9, further comprising: a temperature regulation system associated with the dispensing unit, configured to adjust the temperature of the material in a non-solid state.

11. The system of claim 9, further comprising: at least one additional heating source.

12. The system of claim 11, wherein the dispensing unit is dual-phase.

13. The system of claim 9, further comprising: a plurality of sensors configured to obtain data used to determine parameters for the adjusting of the acoustic pressure.

14. The system of claim 13, wherein the acoustic emitter system is configured to generate acoustic wave patterns dynamically calibrated based on real-time feedback from the plurality of sensors, for real-time adjustment of the parameters.

15. The system of claim 9, wherein the dispensing unit is adapted for dispensing at least two material types and comprises a mechanism for creating composite objects with optimized properties.

16. The system of claim 9, further comprising: a plurality of feed mechanisms for simultaneous dispensing at least two material types.

17. The system of claim 9, further comprising: an automated collection and recycling system configured to reclaim material residues for reuse as feed materials, operatively connected to the dispensing unit and adapted to reintegrate collected materials into the three-dimensional printing apparatus.

18. The system of claim 9, further comprising: a stimulative means to control a rate of the solidification of the material.

19. The system of claim 9, further comprising: at least one subtractive means for removing a portion of the material after the solidification of the material.

* * * * *